United States Patent [19]
Elwakil

[11] Patent Number: 5,833,743
[45] Date of Patent: Nov. 10, 1998

[54] METHOD OF SELECTING AN INK SET OF AN INK JET PRINTER

[75] Inventor: Hamdy A. Elwakil, Chanhassen, Minn.

[73] Assignee: Colorspan Corporation, Eden Prairie, Minn.

[21] Appl. No.: 711,815

[22] Filed: Sep. 10, 1996

[51] Int. Cl.⁶ .................................................. C09D 11/02
[52] U.S. Cl. ................................... 106/31.27; 106/31.57
[58] Field of Search .................. 106/31.27, 31.57; 347/100; 358/502

[56] References Cited

U.S. PATENT DOCUMENTS

| | | | |
|---|---|---|---|
| 4,551,736 | 11/1985 | Suzuki | 346/140 R |
| 4,635,078 | 1/1987 | Sakurada et al. | 346/140 R |
| 4,672,432 | 6/1987 | Sakurada et al. | 358/75 |
| 4,695,846 | 9/1987 | Suzuki | 346/1.1 |
| 4,727,436 | 2/1988 | Kawamura et al. | 358/298 |
| 4,818,285 | 4/1989 | Causley et al. | 106/31.43 |
| 4,855,753 | 8/1989 | Ichikawa et al. | 346/1.1 |
| 4,860,026 | 8/1989 | Matsumoto et al. | 346/1.1 |
| 4,952,942 | 8/1990 | Kanome et al. | 346/1.1 |
| 4,959,659 | 9/1990 | Sasaki et al. | 346/1.1 |
| 5,108,504 | 4/1992 | Johnson et al. | 106/31.37 |
| 5,118,350 | 6/1992 | Prasad | 106/31.58 |
| 5,142,374 | 8/1992 | Tajika et al. | 358/298 |
| 5,143,547 | 9/1992 | Kappele | 106/31.51 |
| 5,145,519 | 9/1992 | Kappele | 106/31.51 |
| 5,185,034 | 2/1993 | Webb et al. | 106/31.43 |
| 5,198,023 | 3/1993 | Stoffel | 106/31.32 |
| 5,273,572 | 12/1993 | Kappele | 106/31.51 |
| 5,534,051 | 7/1996 | Lauw | 106/31.43 |
| 5,536,306 | 7/1996 | Johnson et al. | 106/31.49 |
| 5,679,140 | 10/1997 | McInerney et al. | 106/400 |

OTHER PUBLICATIONS

Product Brochure "Duasyn Acid Rhodamine B–SF" Dye available from Hoechst Celanese Corporation (Dec. 1995).
Product Brochure "Duasyn Direct Turquoise Blue FRL–SF" Dye available from Hoechst Celanese Corporation (Jul. 1995).
Product Brochure "Duasyn Brilliant Yellow GL–SF VP 220" Dye available from Hoechst Celanese Corporation (Jul. 1995).
Product Brochure "Duasyn Direct Black HEF–SF Liq." Dye available from Hoechst Celanese Corporation (Mar. 1995).
Product Brochure "Duasyn Direct Black HEF–SF" Dye available from Hoechst Celanese Corporation (Jul. 1995).
*DuPont HiFi Color System*, E.I. DuPont de Nemours Co., (1994), no month available.
*DuPont Digital Proofer*, E.I. DuPont de Nemours Co., (1996), No Month Available.
*The Seybold Report on Publishing Systems*, V. 24, No. 13, pp. 7–8 (Mar. 13,1995).

*Primary Examiner*—Helene Klemanski
*Attorney, Agent, or Firm*—Philip Fox; Kinney & Lange; Paul H. McDowall

[57] ABSTRACT

A method of printing an image on a substrate with an ink jet printer, the method including the step of ejecting a plurality of discrete portions of ink from the ink jet printer toward the substrate, the ink including at least three different inks with each ink of each different pair of inks containing either different dyes or different concentrations of the same dye, and the step of sequentially forming a plurality of layers of ink dots on the substrate using the discrete portions of ink, with adjacent layers having overlapping ink dots formed of different inks, the plurality of layers of ink dots constituting the image, and the image fully covering all portions of the substrate beneath the image.

18 Claims, 5 Drawing Sheets

- Overall PANTONE® Gamut (Actual readings from swatch books)
- Iris
- a*, b* Gamut Achieved With Set of Inks Presented In Table 1

METHOD OF SELECTING AN INK SET OF AN INK JET PRINTER

BACKGROUND OF THE INVENTION

The present invention generally relates to an ink jet printer ink set. More specifically, the present invention relates to an ink jet printer ink set that includes one or more colored inks in different concentrations of the same dye and to a method of making ink that has a particular combination of L*, a*, and b* values when printed with the ink jet printer.

Ink jet printing is a commonly used method of recording images on recording materials, such as paper or cloth, by discharging discreet droplets of ink from nozzles of a print head and allowing these droplets to be absorbed by the recording material. Ink jet recording offers opportunities for quiet, high speed, full color printing. Also, images printed with ink jet printers seldom need to be fixed or treated after the ink droplets are absorbed on the recording material.

A number of advances have been made in ink jet printing over the past decade or so. Many of these advances have focused on increasing the contrast and continuity of color in printed images to make the images appear more life-like. Other efforts have focused on increasing the vividness of colors within the image and the range or gamut of different colors seen when viewing the image. Many of these prior efforts also concern the desire to use ink jet printing equipment for reproducing images originally printed with other types of equipment, such as lithographic and flexographic equipment. This is problematic because many of the traditional printing techniques rely on pigmented inks, which produce relatively wide color gamuts. Dyes are generally preferred over pigments for ink jet printing because particulate-free inks are more easily prepared with dyes, as compared to pigments, especially dyes that are highly soluble in the ink vehicle. Particulate-free inks made of highly soluble dyes help eliminate colorant settling and precipitation problems, as well as head clogging and jetted ink deflection problems, during ink jet printing operations.

One standard for pigmented inks is the PANTONE® traditional color standard that is published by Pantone, Inc. of Carlstadt, N.J. The PANTONE® traditional color standard is based upon a total of six different colors of pigmented inks. Pantone, Inc. has combined the six different colored inks of the PANTONE® standard in various combinations to produce an over-all PANTONE® traditional color gamut of more than 800 different colors. Pantone, Inc. produces two swatch books that include printed samples of the six basic pigmented inks and also include printed samples of the more than 800 different ink colors formed by the various combinations of the six basic pigmented inks. These PANTONE® swatch books are known as the PANTONE® Color Selector 1000 For Coated Stock (the "PANTONE® Color Selector 1000 swatch book") and the PANTONE® Process Color Imaging Guide (the "PANTONE® Process Color swatch book"). These PANTONE® swatch books also list L*, a*, and b* values of the CIELAB color space for each of the more than 800 ink colors reproduced in the two swatch books. These two PANTONE® swatch books further list the proportions of the six basic pigmented inks that are needed to attain, the more than 800 ink colors provided in the two swatch books.

One ink jet printing industry standard for replicating many of the colors attainable using the PANTONE® traditional color standard, as represented in the PANTONE® Color Selector 1000 swatch book and the PANTONE® Process Color swatch book, is the Iris color proofing standard, which is embodied in both the Iris Smart Jet 4012 color proofing system and the Iris Realist color proofing system. The Iris Smart Jet 4012 color proofing system and the Iris Realist color proofing system are each available from Iris Graphics of Bedford, Mass. The Iris color proofing standard relies upon a set of four different dye-based inks of different colors that may be combined through ink jet printing techniques to produce printed images having a particular gamut of different colors.

The Iris color proofing standard has its limits, though, since the Iris standard is only able to reproduce approximately 50% to 60% of the colors attainable using the PANTONE® traditional color standard, as represented in the PANTONE® Color Selector 1000 swatch book and the PANTONE® Process Color swatch book. There is a need to improve upon the capabilities of the Iris color proofing standard and other existing techniques to expand the gamut of colors attainable in images produced by ink jet printing to encompass still more of the colors attainable using the PANTONE® traditional color standard. Furthermore, expansion of the color gamut attainable by ink jet printing beyond the gamut attained under the PANTONE® traditional color standard would yield more highly saturated colors for producing vividly colored images never before achieved via ink jet printing.

SUMMARY OF THE INVENTION

The present invention includes a method of printing an image on a substrate with an ink jet printer. The method includes the step of ejecting a plurality of discrete portions of ink from the ink jet printer toward the substrate. The ink of the method includes at least three different inks with each different pair of inks containing either different dyes or different concentrations of the same dye. The method further includes the step of sequentially forming a plurality of layers of ink dots on the substrate using the discrete portions of ink. According to the method, adjacent layers of dots have overlapping ink dots formed of different inks, the plurality of layers of ink dots constitute the image, and the image fully covers all portions of the substrate beneath the image. The present invention further includes a method of making an ink, an ink jet printer ink set, and a method of making a plurality of different inks using a colorant.

DETAILED DESCRIPTION OF THE PREFERRED EMBODIMENTS

The present invention generally concerns a technique for identifying individual dye-based inks that may be included in an ink jet printer ink set to produce a wide gamut of high fidelity colored inks and yield vivid, highly reproducible images during ink jet printing. The inventive technique substantially expands the number of different ink colors of the PANTONE® traditional color standard that may be replicated by ink jet printing beyond the number of ink colors of the PANTONE® traditional color standard that may be replicated using ink jet printing standards, such as the Iris color proofing standard. In fact, combinations of individual dye-based inks selected for ink jet printer ink sets according to the identification technique of the present invention replicate more than 99% of the ink colors of the PANTONE® traditional color standard. Furthermore, ink sets containing inks identified via the inventive technique pushes the attainable color gamut beyond gamut of colors obtainable with the PANTONE® traditional color standard and the Iris color proofing standard to make available a number of highly saturated ink colors not previously attainable by ink jet printing.

Figure 1:
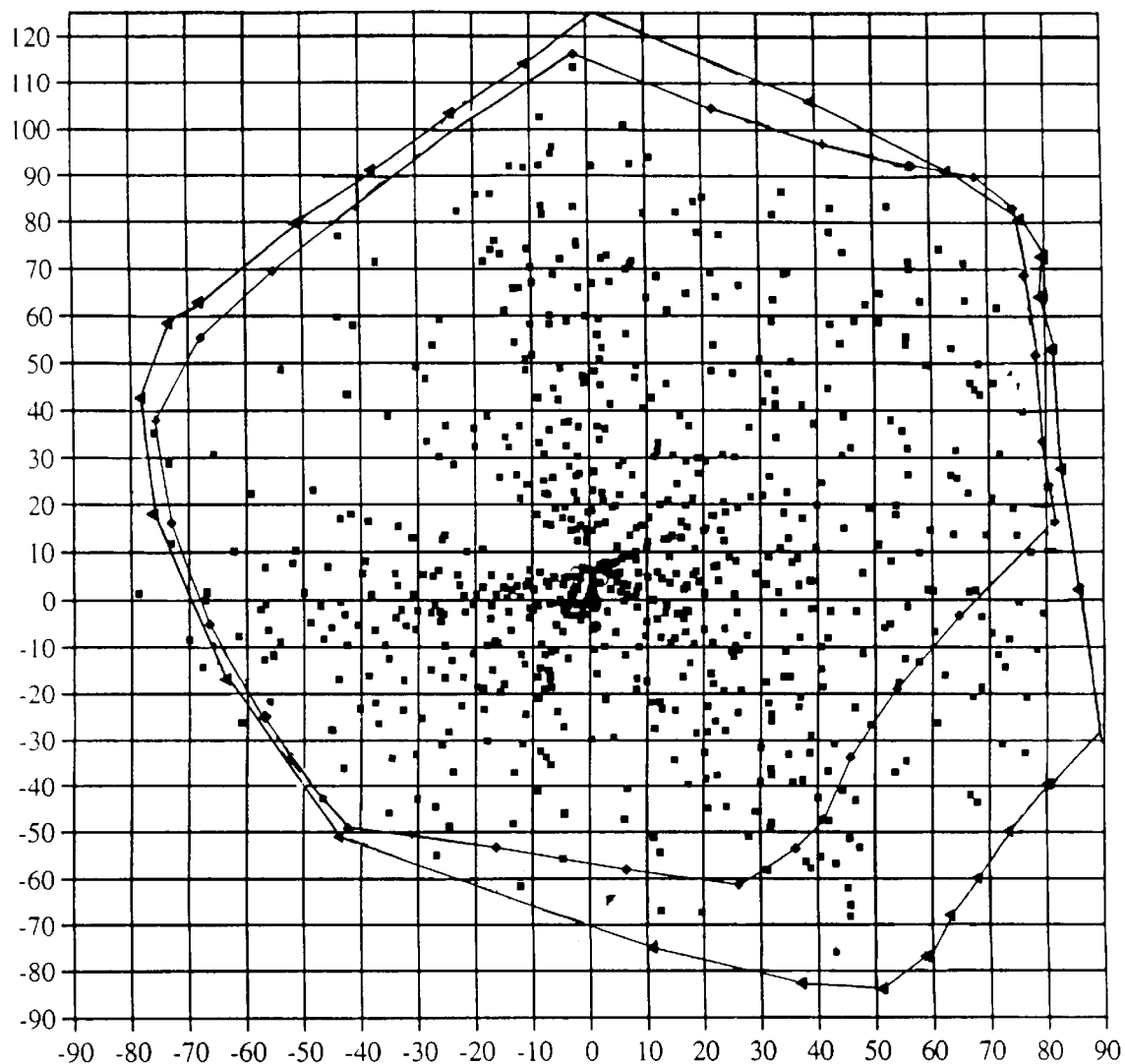
FIG. 1 is a graph of a* and b* values in the CIELAB color space for printed samples of each of the more than 800 ink colors reproduced in the PANTONE® Color Selector 1000 swatch book based upon the PANTONE® traditional color standard, for the colored ink gamut attainable using the Iris Smart Jet 4012 color proofing system that is based on the Iris color proofing standard, and for the colored ink gamut attainable based on use of the ink set of the present invention.

The six basic pigmented inks of the PANTONE® traditional color standard may be combined during printing to produce a gamut of more than 800 different colored inks that are collectively presented in the PANTONE® Color Selector 1000 swatch book and the PANTONE® Process Color swatch book that are published by Pantone, Inc. of Carlstadt, N.J. FIG. 1 includes plots of many of the a* and b* values of the color images presented in the PANTONE® Color Selector 1000 swatch book and the PANTONE® Process Color swatch book that are based on the PANTONE® traditional color standard. The a* and b* values plotted in FIG. 1 for the colored images of the PANTONE® traditional color standard are the actual a* and b* values listed for color images included in the PANTONE® Color Selector 1000 swatch book and/or the PANTONE® Process Color swatch book. For purposes of illustration, only the a* values and b* values are plotted in FIG. 1 since the L* values are more easily manipulated using ink combinations, than are the a* and b* values. For example, L* values may be shifted by incorporating a black ink in the printed image mix.

FIG. 1 also includes a plot of the outer boundary of a* and b* combinations that are attainable in ink jet printed images using the four base ink colors of the Iris color proofing standard, as embodied in the Iris Smart Jet 4012 color proofing system that is available from Iris Graphics of Bedford, Mass. The a* and b* combinations attainable using the Iris color proofing standard were determined from color images produced on the DisplayMaker® ExPress LARGE FORMAT INK JET PRINTER using the four base ink colors of the Iris Smart Jet 4012 color proofing system. The DisplayMaker® ExPress LARGE FORMAT INK JET PRINTER is available from Lasermaster Technologies, Inc. of Eden Prairie, Minn.

FIG. 1 further includes a plot of the outer boundary of a* and b* combinations that are attainable in ink jet printed images using one ink set selected in accordance with the inventive technique for identifying individual inks that produce wide gamut, high fidelity color in ink jet printed images. The a* and b* combinations attainable using one of the ink sets selected in accordance with the inventive technique were determined from color images produced on the DisplayMaker® ExPress LARGE FORMAT INK JET PRINTER. The plot of FIG. 1 illustrates that the gamut of a* and b* combinations attainable by the present invention fully encompasses and significantly expands upon the capabilities of the Iris color proofing standard by attaining more than 99% of the colors attainable using the PANTONE® traditional color standard.

One particular combination of inks of an ink set selected in accordance with the present invention is shown in Table I below. The inks of the Table I ink set include three different magenta inks with different concentrations of magenta dye, three different cyan inks with different concentrations of cyan dye, one yellow ink with a single concentration of yellow dye, and one black ink with a single concentration of black dye. Each of the inks of the present invention, including the inks described in Table I, consist of dye that is dissolved in a clear vehicle. The clear vehicle may include one or more materials, such as solvents, that solubilize the dye in the vehicle. The clear vehicle may also include other functional additives, as explained below. The inks of the ink set described in Table I may be produced in accordance with the procedures described in Examples 4–11 below, respectively, as indicated by notation of the respective example numbers next to the various inks included in Table I.

TABLE I

|  | L* | a* | b* |
| --- | --- | --- | --- |
| Dark Cyan Ink (Example 4) | 51.41 | −39.14 | −55.77 |
| Medium Cyan Ink (Example 5) | 67.00 | −42.85 | −40.86 |
| Light Cyan Ink (Example 6) | 78.99 | −30.78 | −25.62 |
| Dark Magenta Ink (Example 7) | 55.87 | 94.28 | −29.16 |
| Medium Magenta Ink (Example 8) | 73.06 | 82.34 | −22.21 |
| Light Magenta Ink (Example 9) | 82.95 | 52.67 | 45.72 |
| Yellow Ink (Example 10) | 84.40 | 9.39 | 115.40 |
| Black Ink (Example 11) | 0.98 | −1.19 | −4.98 |

The inventive technique of identifying individual inks that cooperatively yield a wide gamut of high fidelity colors in images printed by ink jet printers is based on the theory that individual inks used in the ink set should be selected based upon the individual L*, a*, and b* values of printed images of the individual inks in the CIELAB color space, how the individual inks interact together when printed, and physical characteristics of the individual inks. A first consideration is that each individual ink in the ink set must be highly transparent so that the true colors of the individual inks are not masked by interfering impurities. Limitation of the inks to highly transparent colored inks also permits maximum expansion of color saturation for both printed images of the individual inks and for printed images of different combinations of the inks.

Since transparency is also a measure of impurities, such as salts, within the individual inks, selection of the inks based on high transparency values also helps minimize impurity levels in the selected inks. Minimization of impurities in the inks helps to optimize printer head operation by minimizing precipitation of impurities on printer heads of ink jet printers. Minimization of precipitable impurities also extends the life of printer heads. The conductivity of individual inks selected for ink sets in accordance with the present invention should be about 9.4 m mhos or lower to insure that impurity levels to acceptable levels. Preferably, as many of the individual inks in the ink set as possible have a conductivity of less than about 3 m mhos to further minimize impurity levels in the inks.

Additionally, each ink used in the ink set of the present invention must be compatible with ink jet printer components. Besides having a low level of impurities to enhance printer head operation and extend printer head life, each colored ink of the ink set should have a pH in the range of about 7 to 11 to minimize the potential for corrosion of stainless steel materials typically used in printer head construction. Preferably, as many of the ink set inks as possible has a pH in the range of about 9 to 11 to further minimize the potential for corrosion of stainless steel printer head components.

Another consideration is that the different dyes used in the various colored ink sets should be highly soluble in the vehicle to prevent the dye from coming out of the solution, such as by crystallization, during or after the ink jet printing operation. For example, yellow dyes should have a solubility of at least about 7.5 grams of yellow dye per 92.5 grams of vehicle. Cyan and magenta dyes should have a solubility of at least about 2.5 grams of dye per 97.5 grams of vehicle. Black dyes should have a solubility of at least about 2.0 grams of dye per 98 grams of vehicle. All dye solubilities are based on the dye and the vehicle being at a temperature of about 25° C. during solubility determination.

An additional consideration is that each dye used in the inks of the present invention should be thermally stable, and thus not subject to thermal decomposition, at temperatures ranging up to about 200° C., which is the maximum temperature typically experienced by inks in printer heads of ink jet printers. Another consideration is that each ink selected in accordance with the present invention should be capable of drying very quickly with out any treatment, such as heating, of the printed ink to permit high speed ink jet printing of multiple dot layers on recording substrates.

A further consideration is that each colored ink of any particular ink set selected in accordance with the present invention should be capable of being used in high speed ink jet printing to produce circular-shaped dots that have about the same diameter as dots produced with the other colored inks of the particular ink set. To meet the high speed ink jet printing requirement, each of the inks included in the ink set should have a high surface tension so that individual inks fill ink chambers of respective ink jet printer heads very quickly. Specifically, each of the inks used in the ink set should have a surface tension of at least about 65 dynes per centimeter or more at an ink temperature of about 25° C.

To permit high speed jetting of each of the inks out of the various ink chambers, the individual inks of the ink set should also have a low Brookfield viscosity of less than about 1.5 centipoise at an ink temperature of about 25° C. Preferably, as many of the individual inks in the ink set as possible should have a Brookfield viscosity of less than about 1.2 centipoise at an ink temperature of about 25° C.

The low viscosity of the individual inks of the ink sets also aids in producing circular dots of about the same diameter for each ink of a particular ink set. The high surface tension of the individual inks, absent some type of offsetting influence, would cause the individual dots to be relatively thick and of somewhat different diameter, due to differing interactions of the various ink with substrates at high ink surface tensions. However, formulation of the individual inks to have a low viscosity offsets the required high surface tension of the individual inks and permits dots of the different inks to flatten out in the desired circular shape. Additionally, the actual surface tensions and viscosities are carefully balanced in each of the individual inks of the ink set to give the dots of each of the different inks of a particular ink set about the same diameter, such as about 6 mils when printed via ink jet printing.

The net effect of the process of selecting individual inks for use in the ink set in accordance with the present invention is that each of the inks used in the ink set has very similar physical properties within a relatively narrow range so that the jetability, the speed of ink jet printing, and the printed dot sizes of the different inks are essentially the same for each different ink of the ink set. This is true even though different dyes are used in making different inks and even though inks of the same color may have different dye concentrations since the dye of each different ink makes up only a small percentage of each of the different inks. Forcing the individual inks to have similar physical properties in this manner simplifies the process of ink jet printing using ink sets selected in accordance with the present invention because this use of similar physical properties between different inks negates any need to compensate for differences, other than color, between different inks.

Figure 2:
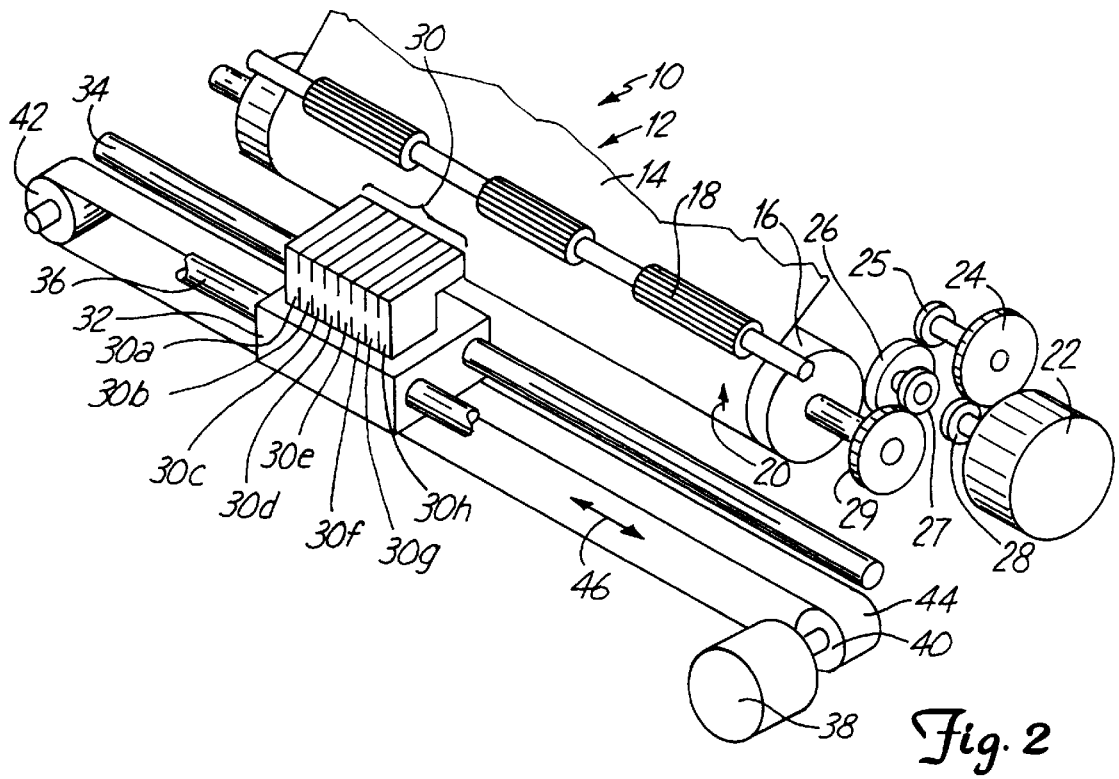
FIG. 2 is a partial isometric view of an ink jet printer that may be used for printing colored images on a substrate using colored inks of an ink set of the present invention.

One example of an ink jet printer that may use ink sets that are selected in accordance with the present invention is depicted at 10 in FIG. 2. The printer 10 includes a recording section 12 that accepts a recording paper 14. The recording paper 14 is moved by a platen 16 and a pinch roller 18 in the direction indicated by an arrow 20 while a picture image (not shown) is recorded on the recording paper 14. The printer 10 includes a paper fed motor 22 and associated gears 24–29. The driving force of the motor 22 is transferred through gears 24–29 to the platen 16, thereby causing the platen 16 to rotate. The printer 10 also includes a printer head unit 30 that is attached on a carriage 32. The printer head unit 30 has a plurality of printer heads 30a–h for emitting discreet volumes of different inks that are included in respective printer heads 30a–h.

The carriage 32 is slidably attached to sliding axes 34 and 36. The printer 10 includes a carriage drive motor 38 that transmits a driving force by linear motion via rollers 40, 42 to a belt 44 and permits movement of the carriage 32 in the direction indicated by an arrow 46.

The printer heads 30a–h each include an ink storage chamber (not shown) that is connected by capillary tubing (not shown) to individual ink chambers (not shown) included within each of the respective printer heads 30a–h. Heat is applied to each ink chamber after ink is drawn into the respective chambers to increase the pressure within the ink chambers and cause the ink in each of the individual ink chambers to be jetted through individual nozzles (not shown) of the printer heads 30a–h toward the recording paper 14. The number of printer heads 30a–h may be varied to change the number of different inks to be jetted onto the recording paper 14.

Figure 3:
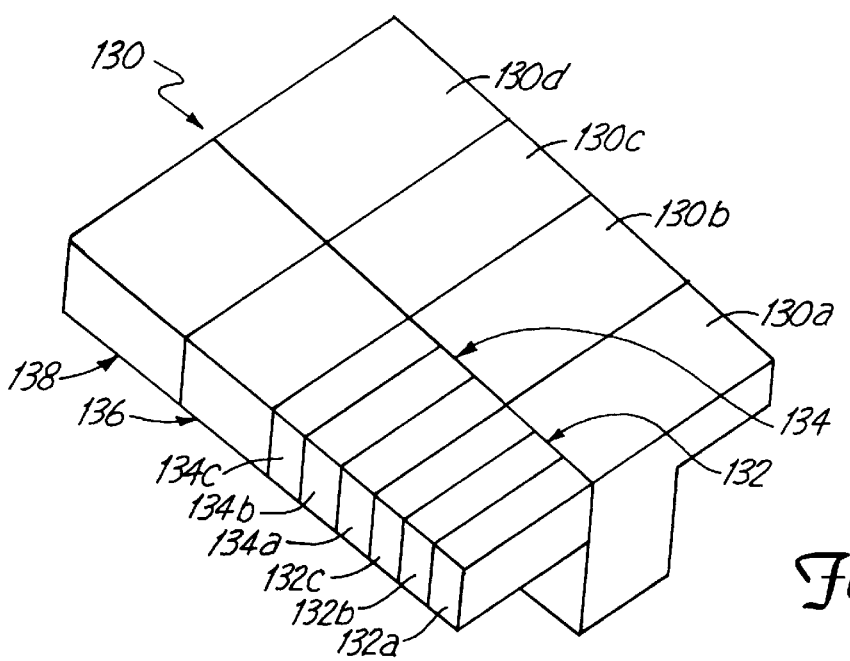
FIG. 3 is an isometric view of a printer head unit of an ink jet printer that may be used for printing colored images on a substrate using colored inks of an ink set of the present invention.

For example, the printer head unit 30 may be modified, as depicted in FIG. 3, to form a printer head unit 130 that includes only four print heads 130a–d. Additionally, one or more of the print heads 130a–d may be adapted to accept different colored inks or inks with different densities of the same colorant. For example, the printer head 130a may include an ink storage unit 132 that is divided into three separate compartments 132a–c for accepting three different colors of ink or for accepting three different inks having different concentrations of the same colorant. Similarly, the print head 130b may include an ink storage unit 134 that is divided into three separate compartments 134a–c for storing three different colors of ink or three different inks having different concentrations of the same colorant. Additionally, the print heads 130c, 130d may include respective compartments 136, 138 for storing a single color of ink. Alternatively, though not depicted, each of the printer heads 130c and 130d may also include ink storage compartments for separately storing multiple inks. In use, the compartments 132a–c and 134a–c sequentially supply different inks in respective ink chambers (not shown) of the printer head 130a and printer head 130b, respectively. The choice of which compartment 132a–c, 134a–c supplies ink to the printer heads 130a, 130b, respectively, is controlled by a conventional type of control unit (not shown) according to programmed instructions.

Though ink sets that are selected in accordance with the present invention may be used in the ink jet printer 10 of FIG. 2, ink sets of the present invention are preferably used in a thermal ink jet printer that is supplied by Lasermaster Technologies, Inc. of Eden Prairie, Minn. One of the preferred ink jet printers that is available from Lasermaster Technologies is the DisplayMaker ExPress LARGE FORMAT INK JET PRINTER. Another of the preferred ink jet printers that is available from Lasermaster Technologies, Inc. is described in detail in the following four patent applications filed by the indicated inventors in the United States Patent and Trademark Office on Tuesday, Sep. 10, 1996, the same date the present application was filed in the United States Patent and Trademark Office:

(1) Ser. No.: 08/709,804
    Title: Method and Apparatus For Manufacturability of a Low Cost Printing Drum
    Inventor: John Bode
(2) Ser. No.: 08/711,992, now U.S. Pat. No. 5,760,800,
    Title: Calibration and Registration Compensation Method For Manufacturing A Drum-Based Print Engine
    Inventors: Larry Lucas, John Novotny, & Neill Johnson
(3) Ser. No.: 08/709,803, now U.S. Pat. No. 5,774,138,
    Title: Method and Apparatus For Compensating For Faulty Ink Emitting Elements In A Drum-Based Print Engine
    Inventor: Arun Kumar
(4) Ser. No.: 08/711,796
    Title: Cooperating Mechanical Sub-Assemblies For A Drum-Based Wide Format Digitized Color Print Engine
    Inventors: Ben Leonard & Neill Johnson All details in these four applications relating to the ink jet printer that is described in these four applications, especially details about use of ink and ink sets in the ink jet printer that is described in these four applications, are hereby incorporated by reference. The serial numbers for these four applications will be supplied after the serial numbers are assigned by the United States Patent and Trademark Office.

Those skilled in the art will readily understand that ink sets produced in accordance with the present invention may also be incorporated into other types of ink jet printers, besides the particular types of thermal ink jet printers mentioned above, such as other types of thermal ink jet printers, piezoelectric ink jet printers, and plunger-types of ink jet printers.

Figure 4:
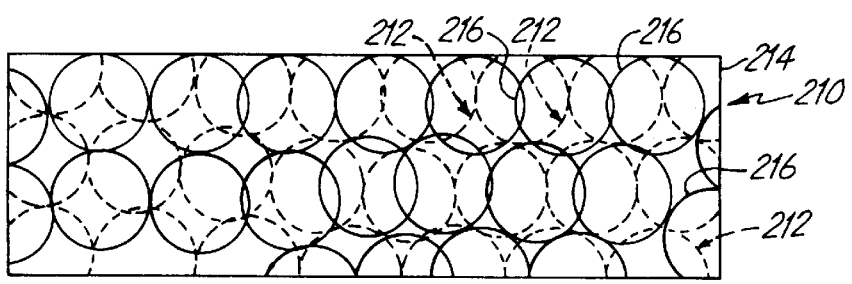
FIG. 4 is a top plan view of a printed image created in accordance with the present invention.

Though ink sets produced in accordance with the present invention may be used to form a variety of different types of images, such as half tone images where dots are stacked on top of individual dots in a pixel matrix, ink sets produced in accordance with the present invention have been found especially useful in forming stochastic images, such as the image 210 depicted in FIG. 4. In the image 210, one or more ink dots 212 are first printed onto a substrate 214 via ink jet printer. The dots 212 may all be the same color or different colors in any combination. In addition any color(s) of ink used to form dots 212 may have two or more different concentrations of the same dye. Each dot 212 may be positioned in any way relative to the other dots 212 of the image. For example, though not depicted in FIG. 4, some of the dots 212 may overlap other dots 212. As another example, any of the dots 212 may be spaced apart from other dots 212 within the image 210 by any distance.

After the dots 212 are positioned on the substrate 210, one or more ink dots 216 are printed onto the dots 212 in any pattern. The dots 216 may all be the same color or different colors in any combination. In addition any color(s) of ink used to form dots 216 may have two or more different concentrations of the same dye. Each dot 216 may be positioned in any way relative to the dots 212 and other dots 216 of the image to obtain desired color combinations in the image 210. For example, any dot 216 may overlap other dots 216 and/or any of the dots 212. As another example, any of the dots 216 may be spaced apart from other dots 216 within the image 210 by any distance.

Also, one or more different layers of additional ink dots may be applied onto the dots 216 to further modify the image 210. Individual ones of the dots of the additional layers may overlap with one or more of the dots 216 and/or any other dots, such as dots 212, that are present in the image 210 to obtain desired color combinations in the image 210. All comments with respect to the dots 216 apply equally with respect to any additional dots applied to the image 210. An important aspect of the image 210 is that the image 210 fully covers the substrate 214 so that the substrate 214 is not directly visible through the image 210. This is different from half tone images (not shown) printed with ink jet printers where the substrate is visible following image application to the substrate.

Ink sets produced in accordance with the present invention permit reproduction of virtually any type of printed color image, no matter how the image was originally printed, because of the wide color gamut ink sets produced in accordance with the present invention are capable of attaining when used in ink jet printing. For example, it has been found that ink sets produced in accordance with the present invention permit vivid and accurate reproduction of printed color images originally produced via lithographic and flexographic printing techniques using pigmented ink sets, such as the PANTONE® traditional color ink set of six different inks.

Ink sets selected in accordance with the present invention may include any combination of any number of different inks, limited only by the number of inks the ink jet printer of choice is able to accommodate. The different inks may include any combination of different colored inks and any number of inks with different concentrations of the same dye. For example, an ink set could be selected in accordance with the present invention to have an ink (1) with one dye (a) at a single concentration of the dye (a), an ink (2) with one dye (b) at a single concentration of the dye (b), inks (3–5) in three different concentrations of dye (c), and inks (6–8) in three different concentrations of dye (d). As another example, a different ink set selected in accordance with the present invention may include inks (1–8) at a single concentration of dyes (a–h), respectively, only. As yet another example, an ink set selected in accordance with the present invention may include inks (1–2) in two different concentrations of dye (a), inks (2–4) in three different concentrations of dye (b), and inks (5–10) in six different concentrations of dye (c).

The reason why some inks are included in the ink set of the present invention in different concentrations of the same dye concerns the resolution power of the human eye for particular colors. As is well known, the resolution power of the human eye varies, sometimes substantially, between different colors. When the resolution of the eye for a particular color is relatively high, a dot of that color is more easily recognized by the eye. Colors with high resolution which are readily recognized by the eye are preferably present in ink sets of the present invention in a plurality of different concentrations of the same dye. Otherwise, lighter toned inks of the same color would be unattainable and expansion of the color gamut attainable using different concentrations of the inks of a particular ink set would be unnecessarily limited. The lower dye concentration, lighter tone versions of the inks having high resolution colors permit expansion of the gamut of different colors attainable by the particular ink set that could not be reached if the ink having high resolution color were included in the ink set at only a single dye concentration.

As an example, in ink sets of the present invention, including cyan, magenta, yellow, and black inks, the cyan and magenta inks are each preferably present in a plurality of different dye concentrations, whereas the yellow ink and the black ink are present in only a single dye concentration. The reason for this is that the resolution power of the human eye is quite high for cyan and magenta colored inks. On the other hand, the resolution power of the human eye is quite low for yellow ink, even at relatively high concentrations of yellow dye in the yellow ink. Accordingly, a light tone of yellow ink inherently exists even though the yellow ink is present in only a single concentration of yellow dye.

The resolution of the human eye is high for black inks. However, only one black ink with a single concentration of black dye is needed because light tones of black ink may be reproduced by a combination of cyan, magenta, and yellow ink dots. A black ink with a relatively high concentration of black dye is included in the ink set, despite the fact that a combination of cyan, magenta, and yellow ink dots reproduces a light tone of black ink, because combination of magenta and cyan ink dots with relatively high concentrations of dye, together with yellow ink dots, does not accurately reproduce the true black color that is attainable when using a high concentration of black dye in a black ink.

When it is desired to use a plurality of different concentrations of a single dye in forming different inks of the same color, such as magenta or cyan inks, selection of the number of different dye concentrations to use requires balancing of competing factors. When only two inks with different concentrations of the same dye are used, images printed with the ink set incorporating the two inks with different concentrations of the same dye require less ink and therefore dry somewhat faster. However, use of only two inks with different concentrations of the same dye undesirably limits the ability of combinations of the different inks of the ink set to stretch the gamut of colors attainable by the ink set.

On the other hand, when the plurality of inks with different concentrations of the same dye includes four or more inks with differing concentrations of the same dye, the inks included in the ink set are able to substantially expand the gamut of colors attainable by combinations of the different inks of the ink set. However, use of a single color ink in four different concentrations of the same dye causes more ink to be required in forming the image and thereby causes a substantial increase in the amount of time required for the image to dry. Additionally, use of four inks with different concentrations of the same dye in ink jet printers is believed to unnecessarily complicate the structure and operation of the ink jet printers. This is because it has been found that use of three inks with different concentrations of the same dye captures a substantial amount of the increase in color gamut that occurs when moving from two inks with different concentrations of the same dye to four inks with different concentrations of the same dye. Additionally, selection of three inks with different concentrations of the same dye, as compared to selection of four inks with different concentrations of the same dye, decreases the amount of ink placed on the image, consequently reducing the amount of time required for the image to dry, and also helps in controlling the structural and operational complexity of the ink jet printer that relies on the ink set to produce the image.

As previously mentioned, one particular combination of inks of an ink set selected in accordance with the present invention is shown in Table I. The inks of the Table I ink set include three different magenta inks with different concentrations of magenta dye, three different cyan inks with different concentrations of cyan dye, one yellow ink with a single concentration of yellow dye, and one black ink with a single concentration of black dye. Table I lists $L^*$, $a^*$, and $b^*$ values from the CIELAB color space that were determined on individual images of the different Table I inks that were printed on white recording paper using the Display-Maker® ExPress LARGE FORMAT INK JET PRINTER that is available from Lasermaster Technologies, Inc. of Eden Prairie, Minn.

The yellow, magenta, and cyan inks of the Table I ink set included the dye of the particular color for the particular ink and a vehicle containing two different solvents for dissolving the dye. The first solvent was distilled water and the second solvent was diethylene glycol, with distilled water being the primary solvent. The diethylene glycol served as a co-solvent with water and as a humectant in each of the different magenta, cyan, and yellow inks of the Table I ink set. The distilled water may be either chemically distilled water or steam distilled water, though steam distilled water is preferred.

A chelating agent, Versene® 100XL, was also included as part of the vehicle of the various magenta, cyan, and yellow inks of the Table I ink set to suspend any negligible amounts of metal impurities in these inks and prevent these metal impurities from precipitating in the ink jet printer head. This use of Versene® 100XL as a chelating agent was primarily precautionary since each of the magenta, cyan, and yellow inks of the Table I ink set have very low conductivities and thus only negligible amounts of metallic impurities. The black ink of the ink set that is listed in Table I included the distilled water and diethylene glycol co-solvents for the black dye, but did not include the Versene® 100XL chelating agent because it is believed that the Versene® 100XL chelating agent and the Duasyn Direct Black HEF-SF Liq. VP 2086 Dye of the Table I Black ink are somewhat incompatible with each other. The vehicle of each of the inks in the ink set of Table I additionally included a small amount of Dowicil® 75 biocide to prevent degradation of the various inks by biologically active species within the various inks. The Versene® 100XL chelating agent and the Dowicil® 75 biocide are each available from Dow Chemical Company of Midland, Mich. The Duasyn dyes used in each of the inks in the Table I ink set are available from Hoechst Celanese Corp. of Coventry, R.I.

The inks listed in the left hand column of Table I were also used in different ink jet printer produced by Lasermaster Technologies, Inc, namely the ink jet printer that is described in the four patent applications listed above at on page 13 of the present application. Table II lists L*, a*, and b* values from the CIELAB color space that were determined on individual images of these different inks that were printed on white recording paper using the ink jet printer that is described in the four patent applications referenced above:

TABLE II

|  | L* | a* | b* |
|---|---|---|---|
| Dark Cyan Ink (Example 4) | 53.64 | −39.69 | −53.46 |
| Medium Cyan Ink (Example 5) | 69.11 | −39.42 | −38.46 |
| Light Cyan Ink (Example 6) | 81.01 | −27.29 | −22.63 |
| Dark Magenta Ink (Example 7) | 52.97 | 90.25 | −35.86 |
| Medium Magenta Ink (Example 8) | 71.08 | 72.66 | −27.52 |
| Light Magenta Ink (Example 9) | 83.93 | 49.36 | −14.49 |
| Yellow Ink (Example 10) | 85.45 | 7.33 | 113.80 |
| Black Ink (Example 11) | 0.98 | −1.34 | −3.97 |

The changes in L*, a*, and b* values between Table I and Table II for the same ink are due to the different amount and coverage of ink in ink dots formed by the DisplayMaker® ExPress LARGE FORMAT INK JET PRINTER versus the ink jet printer that is described in the four patent applications referenced above.

Use of the inventive technique for selecting inks of ink jet printing ink sets permits accurate, consistent, predictable, routine, repetitive, and quick reproduction of printed color images, and particular colors contained within the printed color images, after the proper combination of individual inks in the ink set has been identified by the inventive technique. The extent of the wide gamut of particular colors attainable by individual sets of inks selected in accordance with the present invention are not able to be predicted, but instead must be experimentally determined. However, once the bounds of the color gamut have been identified for particular ink sets selected in accordance with the present invention in a particular ink jet printer, use of subsequently prepared inks of the particular ink set in the same ink jet printer confirms that the particular color gamuts achieved by particular ink sets are highly reproducible. This reproducability is believed to be due in part to the requirement that the dyes used in the inks of the inventive ink sets be very pure and with the related requirement that the various inks of the inventive ink set be highly transparent to light and have very low conductivities.

The inks of ink sets that are selected in accordance with the present invention generally include dye as the colorant and a suitable solvent or mixture of solvents as the vehicle. Furthermore, as the inks of the Table I ink set illustrate, the vehicle may also include other functional components, such as the Versene® 100XL chelating agent and the Dowicil® 75 biocide. The dyes that may be used to form the various inks of ink sets of the present invention include various water-soluble dyes, such as, but not limited to, direct dyes and acid dyes that have the previously mentioned properties, including good thermal stability, high purity, and high solubility in the vehicle, and that produce highly transparent inks.

The solvent portion of the vehicle consists primarily of water along with a lesser amount of a wetting agent, such as various types of water soluble organic solvents. Examples of suitable water soluble organic solvents include $C_1$–$C_4$ alkyl alcohols, such as methanol, ethanol, n-propanol, isopropanol, n-butanol, sec-butanol, tertiary-butanol, iso-butanol, and the like; amides, such as dimethylformamide, dimethylacetamide, and the like; ketones or keto alcohols, such as acetone, diacetone alcohol, and the like; ethers, such as tetrahydrofuran, dioxane, and the like; polyalkylene glycols, such as polyethylene glycol, polypropylene glycol, and the like; $C_2$–$C_6$ alkylene group-containing alkylene glycols, such as ethylene glycol, propylene glycol, butylene glycol, triethylene glycol, 1,2,6-hexane triol, thio glycol, hexylene glycol, diethylene glycol, and the like; glycerol; lower alkyl ethers of polyhydric alcohols, such as ethylene glycol methyl ether, diethylene glycol methyl and ethyl ethers, triethylene glycol monomethyl and monoethyl ethers, and the like; and nitrogen containing heterocyclic ketones, such as N-methyl-2-pyrrolidone, 1,3-dimethyl-2-imidazolydione, and the like.

Of these various water-soluble solvents, polyhydric alcohols, such as diethylene glycol and the like; and lower alkyl ethers of polyhydric alcohols, such as triethylene glycol monomethyl and monoethyl ethers, and the like are preferred. Of these, the polyhydric alcohols are particularly preferred since polyhydric alcohols are particularly effective as a wetting agent to prevent clogging of ink-jet nozzles by precipitation of dyes based upon vaporization of water in inks.

The water content in the inks that may be included in the ink set of the present invention generally may range between about 10% to 95%, preferably between about 30% and 95%, and more preferably between about 60% and 95%, by weight, based on the total weight of the particular ink. The amount of water soluble organic solvent included in the various inks of the ink set may generally range from about 5 to 95%, preferably about 5% to 50%, and more preferably about 5% to 20%, by weight, based on the total weight of the particular ink.

It has been surprisingly discovered that ink dots produced by ink jet printing inks that are selected in accordance with the present invention may be overlapped with each other in any order without affecting the color that is visually observed when looking at the layered ink dots. This ability to change the order of overlapping dots without changing the visually observed color applies to ink dots based on any colors of inks, other than inks based on black dye. This ability has also been found to exist even when two or more of the ink dots are based on inks having different concentrations of the same dye.

As an example, this ability has been observed with respect to the cyan inks, the magenta inks, and the yellow ink of Table I, when the black ink of Table I is excluded. No matter how dots of these Table I inks are stacked, the visually observed color of the stacked ink dots remains the same. For instance, when dots of the medium cyan ink of Table I are laid down on a sheet of white recording paper (not shown), dots of the medium magenta ink of Table I are laid down on the medium cyan ink, and dots of the yellow ink of Table I are then laid down on the dots of the medium cyan ink, using any particular ink jet printer, it has been found that the color visually observed by looking at the image formed by the various dots layered on the white recording paper is the same as the visually observed color of a different image where dots of the same yellow ink are first laid down on the white recording paper, dots of the same medium cyan ink are then laid down on the yellow ink dots, and dots of the same medium magenta ink are then laid down on the medium cyan ink dots by the same ink jet printer.

This ability to order the different colors of inks differently, while continuing to visually observe the same color in viewing the different image, is believed to be due to both the high transparencies of the inks produced in accordance with the present invention and the high purity of the dyes used in forming the inks of the present invention. Stacking different colors of prior art inks in different orders on substrates by ink jet printing cause the visually observed color of the resulting images to change somewhat, apparently because prior art inks are typically somewhat opaque and/or rely upon dyes with lower purities than those employed in the present invention.

In another aspect of the present invention, it has been found that for a particular color of ink at a particular concentration of dye, plots of light transmission by a diluted form of the ink correlate very closely to L*, a*, and b* values of images printed with the undiluted form of the ink using an ink jet printer. This has been found to be particularly helpful since manufacturer's representations as to the purity of different lots of the same dye are not always accurate. Also, purities of the same dye typically varies between manufacturers.

This inventive technique permits reproduction of an ink yielding an image with particular L*, a*, and b* values, when using the same ink jet printer with the same ink jet printer settings. Specifically, this inventive technique permits reliance on the percent of light transmitted through the diluted form of the ink, rather than reliance on manufacturers' representations about the purity of the dye used in the ink. This is important since shifts in dye purity make it impossible to rely upon dye concentrations to reproduce inks for reproducing images having particular L*, a*, and b* values using the same ink jet printer with the same ink jet printer settings that was used to create the original of the image. Additionally, this inventive technique permits reliance on the percent of light transmitted through the diluted form of the ink, rather than reliance on measurements of the weight of dye included in the ink. This is important since the weight of dye actually added during a particular addition step may easily be in error due to the light, dusty nature of powdered, bulk dye which readily permits significant amounts of the dye to be lost during transfer from the weighing equipment to the ink mixing container.

The basic steps of practicing this inventive correlation technique are straight forward. A plurality of different inks having different concentrations of the same dye are first produced in accordance with the general teachings of Examples 1, 2, and 4–6 to create a plurality of ink standards. Preferably, about 10 to 15 different inks having different concentrations of the same dye are prepared to give a wide range of plot-able data points that are spaced relatively close to adjoining data points. The general technique exemplified by Examples 1, 2, and 4–6 first entails formation of clear vehicle that includes any selected solvent(s), such as a mixture of water and diethylene glycol, along with minor amounts of a chelating agent, such as Versene® 100XL, and a biocide, such as Dowicil® 75. Ink concentrate is then formed by mixing the selected dye with part of the clear vehicle. Ink standards, in the form of the plurality of different inks having different concentrations of the same dye, are then prepared by mixing different weight ratios of the ink concentrate and the vehicle. Also, each ink concentrate, standing alone, may be additional ink standards for the particular dye used in forming the respective ink concentrates.

After the ink standards are prepared, each of the different ink standards are then printed on a recording substrate with an ink jet printer at particular ink jet printer settings. Then, about an hour after the images are printed, the L*, a*, and b* values are determined for each of the different images associated with the respective ink standards. The L*, a*, and b* values that are obtained are then plotted against the weight percent of the dye in the respective ink standards, such as in the plot of FIG. 5 for cyan colored ink standards.

Next, the percent light transmission of a diluted form of each of the ink standards, is determined and plotted versus the L*, a*, and b* values determined above for the ink jet printed images of the undiluted ink standards. The different ink standards are diluted prior to determining percent transmission of light so that a meaningful spread in percent light transmission values exists. The dilution is generally necessary since it has been found that the dimensions of the path across the sample where light transmission is determined in many types of light transmission determination equipment is too long to permit a spread of more than about 5% in light transmission values between the ink standards with the highest and the lowest concentration of dye. When the path across the sample where light transmission is determined, using a particular piece of light transmission determination equipment, is short enough to permit a spread of about 40% to about 50% in light transmission values across all of the ink standards, it is thought that dilution of the ink standards is unnecessary to have a meaningful spread in percent light transmission values across the different ink standards.

As one example, when two ink standards having the highest and lowest dye concentrations of the same dye, respectively, exhibit 10% light transmission and 15% light transmission, respectively, the various ink standards based on the same dye should be diluted by an equivalent amount, such as by the dilution procedure detailed below, so that the light transmission values of the diluted ink standards having the highest and lowest concentrations of the dye exhibit light transmission values that vary by at least about 40% to 50%. As another example, when two ink standards having the highest and lowest dye concentrations of the same dye, respectively, exhibit 10% light transmission and 90% light transmission, respectively, the various ink standards based on the same dye need not be diluted since the light transmission values of the ink standards having the highest and lowest concentrations of the dye exhibit light transmission values that vary by 80%, which is greater than the at least about 40% to 50% threshold.

Assuming that dilution of the ink standards has been determined necessary, sufficient dilution should be undertaken to insure that the diluted ink standards have the at least about 40% to 50% spread in light transmission values specified above. When the ink standards include the inks of Table I that are colored black, cyan, or magenta and are prepared in accordance with Examples 4–10 below, it has been determined that the ink standards should be diluted to a ratio of about 0.09 parts by weight of the original undiluted ink standard per 100 parts of the vehicle, such as the vehicle described and produced in Example 1. Preferably, about 10 to 15 different ink standards having different concentrations of the same dye are diluted in this fashion to provide a full range of data points for the plot of percent light transmission of the diluted form of the ink standards inks versus L*, a*, and b* values of the printed image that is based upon the undiluted ink standards.

The dilution to the ratio of about 0.09 parts of the original ink standard to 100 parts of the vehicle may be carried out via any suitable dilution procedure, such as the following exemplary procedure, for each of the different ink standards. First, three parts of the undiluted ink standard are combined with 100 parts of the vehicle to form an intermediate diluted ink standard. Then, three parts of the intermediate diluted ink standard are mixed with 100 additional parts of the vehicle to attain the target ratio of about 0.09 parts of the undiluted ink standard to 100 parts of the vehicle.

When the ink standards include the ink of Table I that is colored yellow and are prepared in accordance with Example 11 below, it has been determined that the ink standards should be diluted to a ratio of about 0.0027 parts by weight of the original undiluted ink standard per 100 parts of the vehicle, such as the vehicle described and produced in Example 1. To attain this dilution, the dilution procedure described above for the black, magenta, and cyan inks is followed, with the exception that a third dilution is made for the yellow ink to attain the ratio of about 0.027 parts of the undiluted yellow ink standard per 100 parts of the vehicle. Again, about 10 to 15 different ink standards having different concentrations of the same dye are preferably diluted in this fashion to provide a full range of data points for the plot of percent light transmission of the diluted form of the ink standards inks versus L*, a*, and b* values of the printed images that are based upon the undiluted ink standards.

It is to be understood that the following discussion may be modified to involve determination of the % light transmission across the various undiluted ink standards and plotting of the % light transmission of the undiluted form of the ink standards versus L*, a*, and b* values of the printed image that is based upon the undiluted ink standards when the ink standards having the highest and lowest concentrations of the dye exhibit light transmission values that vary by at least about 40% to 50% and dilution is therefore unnecessary.

After the ink standards are diluted, the percent transmission of light for each diluted sample of the ink standard is determined using the Spectronic 20+ Spectrophotometer in accordance with the procedure set forth in full detail below in the section entitled PROPERTY DETERMINATION AND CHARACTERIZATION TECHNIQUES. After the percent light transmission values are determined for the various diluted samples of the ink standards, the percent light transmission values for the various diluted samples of the ink standards are plotted versus the L*, a*, and b* values determined for the respective ink jet printed images for the ink standards, namely the inks having the various undiluted concentrations of the same dye. This plot of the percent transmission values versus the L*, a*, and b* values is illustrated in FIG. 6 for diluted samples of cyan dyes prepared in accordance with the general principles of Examples 1, 2, and 4–6.

The plot of percent transmission values versus L*, a*, and b* values may then be used to prepare inks, and ink concentrate, that are based on the same dye as the ink standards used to create the plot of percent transmission values versus L*, a*, and b* values and that exhibit desired L*, a*, and b* values when printed with the ink jet printer used for printing the various ink standards at the particular ink jet printer settings used when printing the various ink standards. In the following discussion of how to use the inventive procedure, the plot of percent transmission values versus L*, a*, and b* values will be referred to as the plot of FIG. 6, for purposes of brevity.

Figure 6:
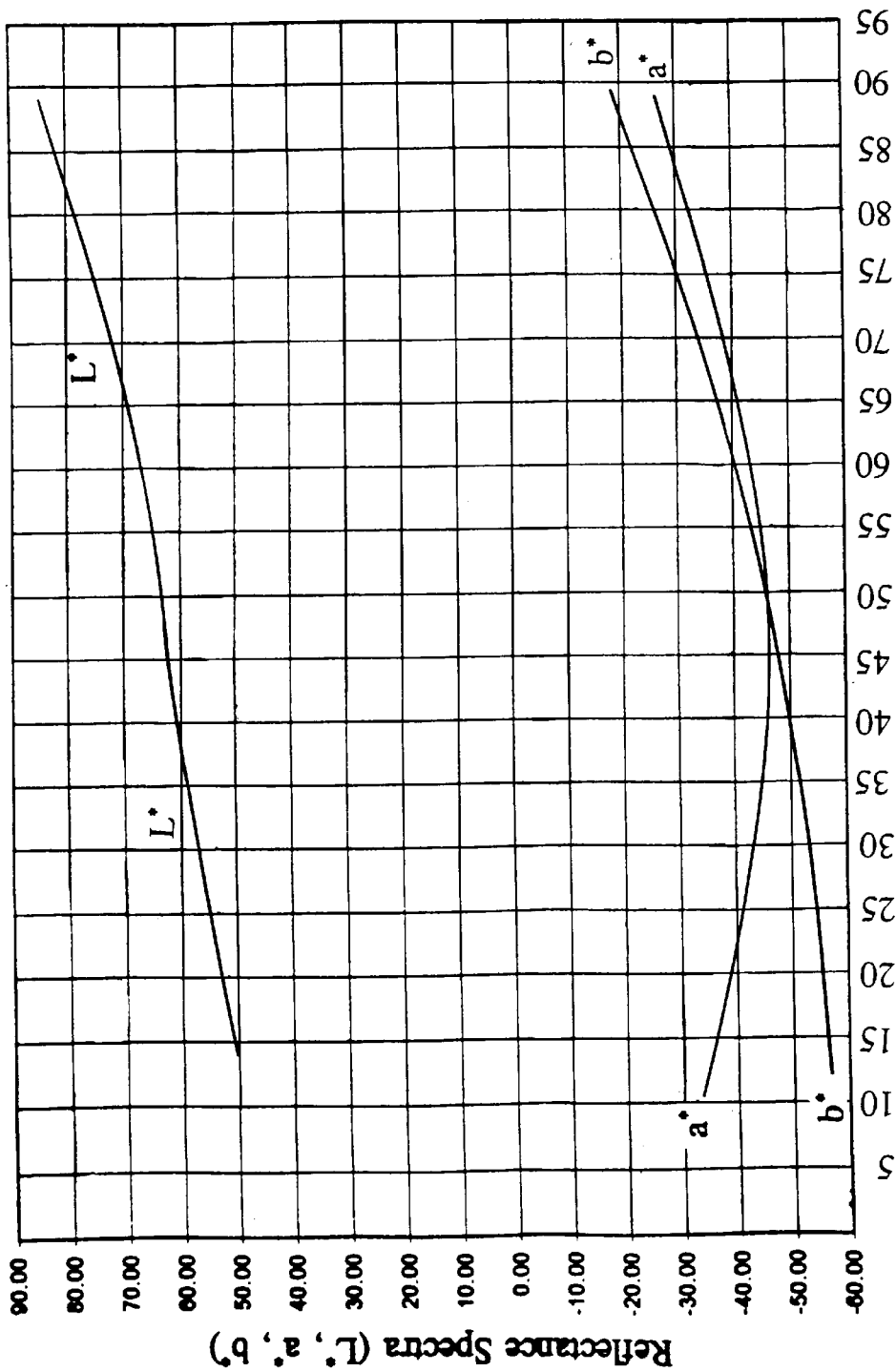
FIG. 6 is a graph of L*, a*, and b* values of printed images created using inks of the present invention versus the percent of light transmitted through diluted forms of the inks.

To prepare an ink or ink concentrate that is based on the same dye as the ink standards used to create the plot of FIG. 6 and that produce an image with particular L*, a*, and b* values when the image is printed with the ink jet printer at the particular ink jet printer settings used for the ink standards, the following procedure may be used. First, the ink concentrate is prepared in accordance with the general principles of Examples 1 and 2 below, using the same dye as was used in the ink standards relied upon when preparing the plot of FIG. 6. Then, some of the ink concentrate is diluted with some of the vehicle to create ink, such as ink I. Alternatively, the ink I may consist entirely of the ink concentrate so that the inventive procedure described below may be used to match the ink I that consists entirely of the ink concentrate to an original ink concentrate before the new ink concentrate is used to form the ink I that includes vehicle in addition to ink concentrate.

After Ink I is prepared, Ink I is then diluted to the same extent as the diluted form of the ink standard used to create the plot of FIG. 6, such as to about 0.09 parts of ink I to 100 parts of the vehicle. Then the % transmission of the diluted form of ink I is determined and the L*, a*, and b* values that will be exhibited by a printed image of the undiluted form of ink I are determined from the plot of FIG. 6. If the L*, a*, and b* values found on the plot of FIG. 6 are not the desired L*, a*, and b* values, the movement along the L*, a*, and b* plots of FIG. 6 are considered to determine if the % transmission of the diluted form of ink I will need to be increased or decreased to attain the desired L*, a*, and b* values.

If the % transmission of the diluted form of ink I needs to be increased, additional vehicle is added to ink I to create ink II. If the % transmission of the diluted form of ink I needs to be decreased, additional ink concentrate is added to ink I to create ink II. Then, no matter which procedure is used to form ink II, ink II is diluted to the same extent as the diluted form of the ink standard used to create the plot of FIG. 6, the % transmission of the diluted form of ink II is determined, and the plot of FIG. 6 is again considered as indicated above to determine whether ink II will have the desired L*, a*, and b* values when printed. If so, no further action is necessary. If not, additional vehicle or ink concentrate, as determined from the plot of FIG. 6, is added to ink II to create ink III. Ink III is then subjected to the same scrutiny as described above for ink II. This procedure is continued until it is determined that the ink III, IV, or etc. will have the desired L*, a*, and b* values when printed. Again, it is to be understood that the foregoing discussion may be modified to determine % transmission without diluting inks I, I, II, IV, or etc. when the % transmission plot of FIG. 6 is based on the % transmission of the undiluted form of the ink standards.

Figure 5:
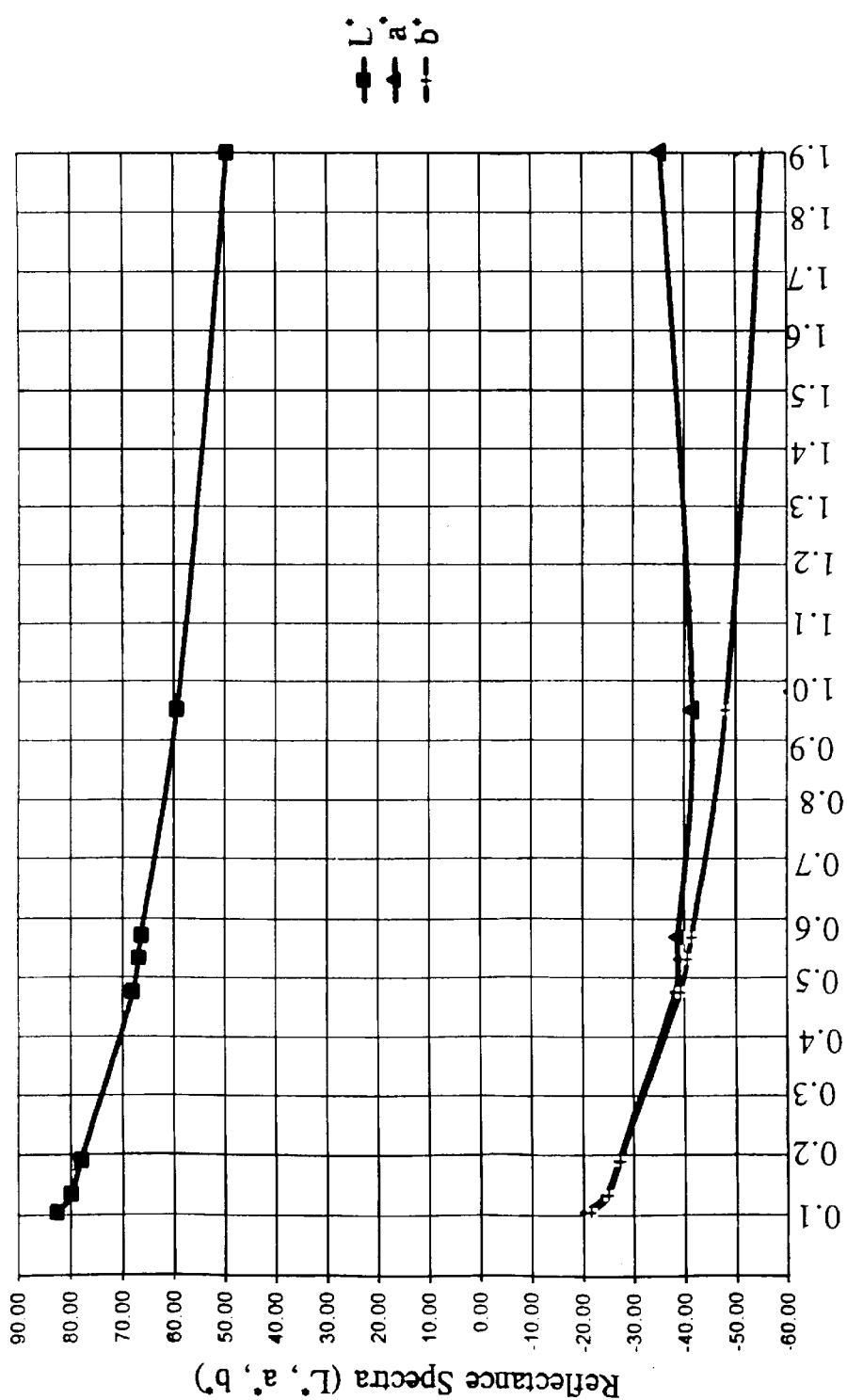
FIG. 5 is a graph of L*, a*, and b* values of printed images created using inks of the present invention versus the weight percent of dye in the inks.

In the following alternative discussion of how to use the inventive procedure, the plot of weight percent dye versus L*, a*, and b* values will be referred to as the plot of FIG. 5, for purposes of brevity. If it is desired to create ink having the same dye as particular ink standards and the purity of the dye that will be used to form the ink is known to have the same purity as the dye used to form the ink standards, the plot of FIG. 5 may be relied upon to form ink with desired L*, a*, and b* values when printed with the ink jet printer at the particular ink jet printer settings used for the ink standards. Specifically, based upon the known weight percent of dye in the ink concentrate, a sufficient amount of the vehicle is added to a portion of the ink concentrate to form ink that will have the weight percent of dye indicated in the plot of FIG. 5 that corresponds to the desired L*, a*, and b* values in the plot of FIG. 5. Great care should be exercised when relying on this alternative form of the inventive procedure, since even if the dye that will be used to form the ink is selected from the same sample of dye used to form the ink standards, the dye that will be used to form the ink may not have the exact same purity as the dye used to form the ink standards because of non-homogenous mixing of the dye and any dye impurities or settling of the dye impurities relative to the dye. Therefore, the procedure described above with respect to FIG. 6 remains the safest way to reproduce inks that will have the desired L*, a*, and b* values.

The benefit of the plot of percent transmission versus the L*, a*, and b* values is that one can obtain a particular dye of a different lot, or from a different manufacturer, and rely on the percent transmission versus L*, a*, and b* plot, such as the plot of FIG. 6, to reproduce the printed image L*, a*, and b* values of an originally produced ink that serves as a standard one seeks to replicate. This inventive procedure wipes out errors due to different purities of the same dye that are sometimes not reflected in manufacturer's literature. This procedure also permits one to purchase lower purity dye at a cheaper cost and yet replicate an ink originally produced with a higher purity, more expensive dye. Though the plot of FIG. 6 specifically concern inks formed of a particular cyan dye, those skilled in the art will readily understand that the inventive procedure may be replicated for any other inks formed with a different dye of a different color, such as a yellow dye, a red dye, a blue dye, a green dye, etc. Thus, the inventive procedure has wide applicability to permitting predictable and highly repeatable duplication of images having particular L*, a*, and b* values based upon prior inks.

Another aspect of the present invention concerns the method of mixing ink components to form either a single ink having a particular dye or different inks having different concentrations of the same dye. The first step of the inventive mixing method involves mixing the solvent components of the vehicle, such as water and diethylene glycol, in a large beaker. Ink concentrate, such as cyan ink concentrate, is then formed by mixing dye of the desired color, or dyes of the desired colors, with part of the vehicle. For example, 3000 grams of the vehicle may be prepared, with 975 grams of the vehicle then being mixed with 25 grams of dye, such as Duasyn Direct Turquoise Blue FRL-SF dye, to make 1000 grams of cyan ink concentrate.

Then, in one aspect of this technique, a measured amount of the ink concentrate is blended with a measured amount of the vehicle to yield an ink with a particular concentration of the dye that is contained in the ink concentrate. This aspect of the technique may be applied to any dye, or any mixture of dyes, and to any vehicle for the dye or mixture of dyes to form any ink concentrate and, subsequently, any ink containing the dye or mixture of dyes.

This aspect of the technique of the ink concentrate-based technique remedies a significant problem. Specifically, this aspect of the technique reduces the quantitative impact of errors in measuring dye when making the ink. For example, when it is desired to make ink with a particular concentration of dye, ink concentrate is prepared in accordance with the general principles exhibited in Examples 1 and 2, and the ink concentrate is then diluted with the vehicle to form the ink. If the ink concentrate contains 2.5 weight percent of the dye, and a 1 gram error is made in measuring the weight of the ink concentrate when diluting the ink concentrate to form the ink, the error in the amount of the dye included in the ink will be 0.025 grams when it was intended for 300 grams of the ink concentrate to be mixed with 700 grams of the vehicle. Since the correct amount of dye in the ink would be 7.5 grams, this amounts to a 0.33% error in the amount of dye added to the ink. On the other hand, if a 1 gram error were made when attempting to add 7.5 grams of the dye to 992.5 grams of the vehicle to make 1000 grams of ink, this would amount to a 13.3% error in the amount of dye added to the ink. The 1 gram error in measuring the weight of dye added directly to the vehicle is certainly within the realm of possibilities since dye is typically a light, dusty material that is easily disturbed and lost when transferring the material from the weighing scale to the ink component mixing container. This discussion illustrates that one beneficial aspect of the technique relying on the ink concentrate for production of the ink is that the ink concentrate-based technique greatly reduces the quantitative impact of the same size measurement error during production of the dye, as compared to when dye is directly added to the vehicle without relying on use of an ink concentrate.

In another aspect of the ink concentrate-based technique, some of the ink concentrate is blended with some of the vehicle two or more different times to yield two or more inks that each contain different concentrations of the same dye or dye mixture, namely, the dye or dye mixture contained in the ink concentrate. The weight ratio of vehicle to ink concentrate is different in each of the two or more inks to attain the different concentrations of the same dye or dye mixture in each of the inks. This aspect of the technique may be used to form any number of inks that each contain different concentrations of the same dye or dye mixture. Also, this technique may be applied to any dye, or mixture of dyes, and to any vehicle to form any two or more inks having different concentrations of the same dye or dyes.

This technique of forming different inks with different concentrations of the same dye(s) by performing different dilutions on samples of the same ink concentrate remedies at least two significant problems. First, the technique reduces the quantitative impact of errors in measuring dye when making the ink. For example, as explained above, if a 1 gram error is made in measuring the weight of the ink concentrate containing 2.5 weight percent of dye, when diluting the ink concentrate to form a first ink, the error in the amount of the dye included in the ink will be 0.025 grams when it was intended for 300 grams of the ink concentrate to be mixed with 700 grams of the vehicle. Since the correct amount of dye in the ink would be 7.5 grams, this amounts to a 0.33% error in the amount of dye added to the first ink. On the other hand, if a 1 gram error were made when attempting to add 7.5 grams of the dye to 992.5 grams of the vehicle to make 1000 grams of the first ink, this would amount to a 13.3% error in the amount of dye added to the first ink. Similarly, when making a second ink with the ink concentrate, a 1 gram error in measuring the weight of the ink concentrate, when diluting the ink concentrate to form the ink, amounts to a 0.25% error in the amount of dye added to the second ink when it was intended for 400 grams of the ink concentrate to be mixed with 600 grams of the vehicle. On the other hand, if a 1 gram error were made when attempting to add 10 grams of the dye to 990 grams of the vehicle to make 1000 grams of the second ink, this would amount to a 10% error in the amount of dye added to the second ink. Finally, when making a third ink with the ink concentrate, a 1 gram error in measuring the weight of the ink concentrate, when diluting the ink concentrate to form the third ink, amounts to a 0.20% error in the amount of dye added to the third ink when it was intended for 500 grams of the ink concentrate to be mixed with 500 grams of the vehicle. On the other hand, if a 1 gram error were made when attempting to add 12.5 grams of the dye to 987.5 grams of the vehicle to make 1000 grams of the third ink, this would amount to an 8% error in the amount of dye added to the third ink.

This discussion illustrates that the same magnitude of measurement error will cause an error ranging from 8% to 13.3% when directly adding the dye to form the first, second, and third inks, whereas the same magnitude of measurement error will cause an error ranging only from 0.2% to 0.33% when forming the first, second, and third inks using the ink concentrate. Thus one beneficial aspect of the technique relying on the ink concentrate for production of the ink is that the ink concentrate-based technique greatly reduces the quantitative impact of the same size measurement error during production of the dye.

Figure 7:
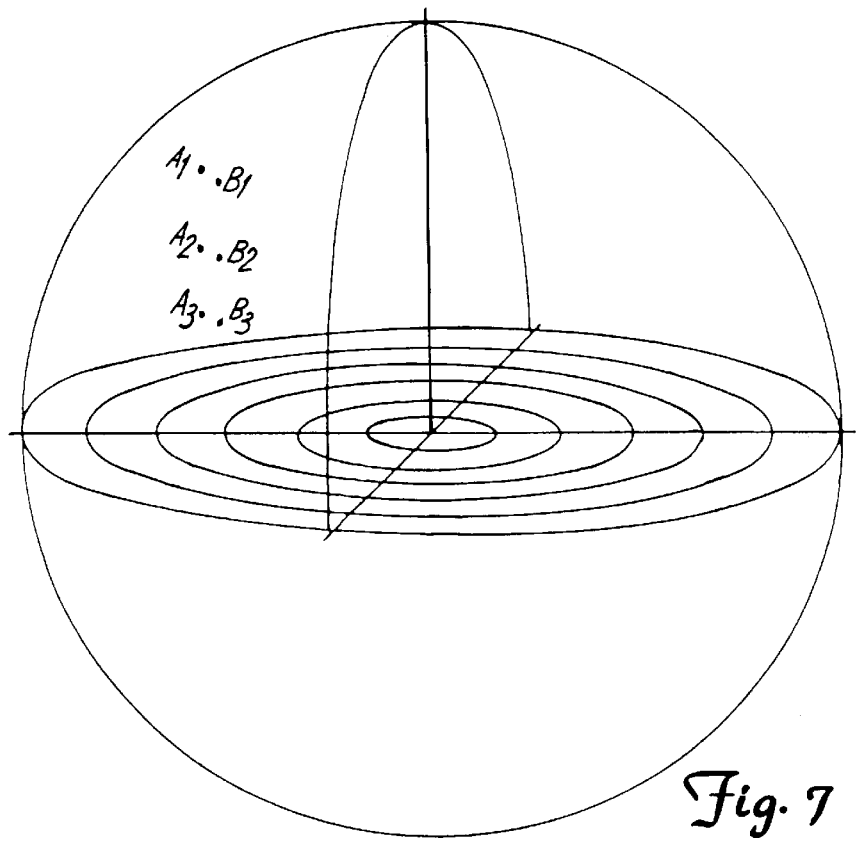
FIG. 7 is a graph of L*, a*, and b* values of two printed image created in accordance with the method of the present invention.

The technique of forming different inks with different concentrations of the same dye(s) by performing different dilutions on samples of the same ink concentrate also remedies another significant problem, as explained more fully below. When three ink standards with different concentrations of the same dye are formed based on a single ink concentrate, the three inks standards will have different $L^*$, $a^*$, and $b^*$ values, when printed with a particular ink jet printer, such as the $L^*$, $a^*$, and $b^*$ values plotted as $A_1$, $A_2$, and $A_3$ in the CIELAB color space of FIG. 7. If a minor error is made in measuring the amount of ink concentrate needed to replicate the three ink standards, this minor error will cause (1) the $L^*$ values of each of the three inaccurately formed inks to shift in the same direction by the same relative amount, (2) the $a^*$ values of each of the three inaccurately formed inks to shift in the same direction by the same relative amount, and (3) the $b^*$ values of each of the three inaccurately formed inks to shift in the same direction by the same relative amount away from the correct $A_1$, $A_2$ and $A_3$, such as to the $L^*$, $a^*$, and $b^*$ values indicated by $B_1$, $B_2$ and $B_3$ in FIG. 7.

This procedure of forming inks having different concentrations of the same dye by diluting pre-formed ink concentrate helps to prevent minor measurement errors from ballooning into errors that cause the $L^*$, $a^*$, and $b^*$ values of the inaccurately formed inks to shift in different directions and by different magnitudes, relative to each other, in the CIELAB color space. Thus. one benefit of this inventive procedure is that the $\Delta E^*_{ab}$ value calculated between any two of the inks plotted at $B_1$, $B_2$ and $B_3$ in FIG. 7 remains the same as the respective $\Delta E^*_{ab}$ value calculated between any respective two of the inks plotted at $A_1$, $A_2$ and $A_3$ in FIG. 7, even though a minor measurement error in forming the ink concentrate causes the $B_1$, $B_2$ and $B_3$ values to shift relative to the $A_1$, $A_2$ and $A_3$ values in FIG. 7.

Figure 8:
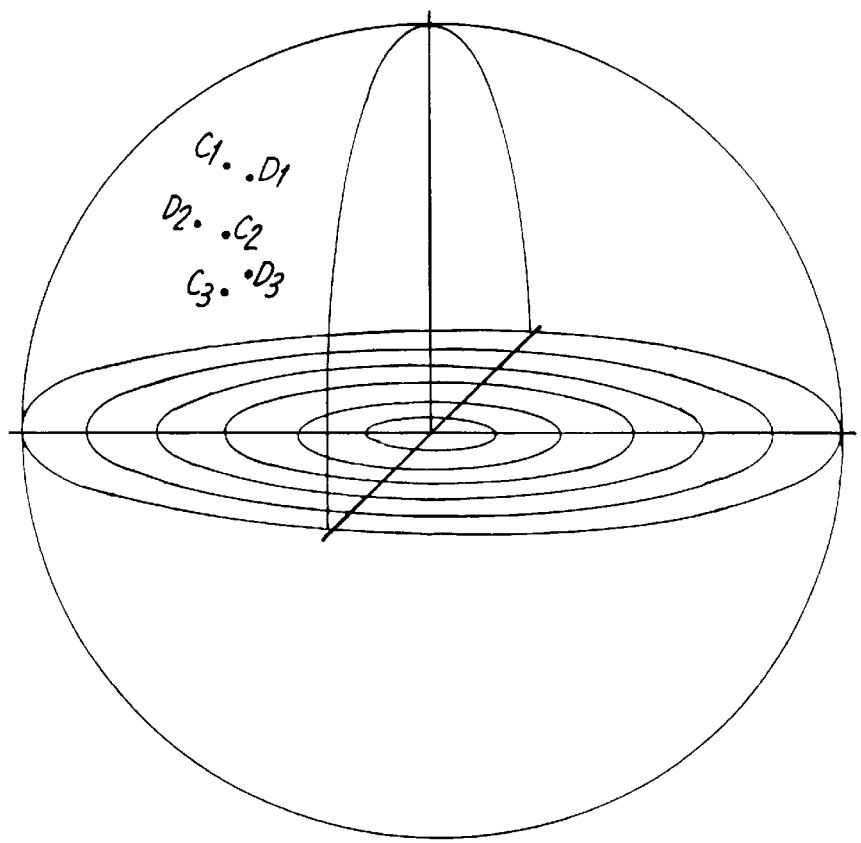
FIG. 8 is a graph of L*, a*, and b* values of two printed image created by a method other than the method of the present invention.

The importance of this technique is further highlighted by looking at the types of error improper measurement may introduce when using a technique other than one based on addition of ink concentrate to vehicle for ink formation. For example, suppose that the vehicle is first prepared and three different weights of the same dye are included in three equal weight portions of the vehicle to form three inks having the $L^*$, $a^*$, and $b^*$ values plotted at $C_1$, $C_2$, and $C_3$ in FIG. 8 when printed with a particular ink jet printer. Additionally, assume that when trying to replicate these three inks plotted at $C_1$, $C_2$, and $C_3$, in FIG. 8, differing measurement errors were made when adding the same dye to each of the three equal weights of vehicle. If the dye measurement errors occurred in varying directions, such as including too much dye in the formulation of one of the three inks plotted at $C_1$–$C_3$ and including too little dye in the remaining two of three inks plotted at $C_1$–$C_3$, these three different errors may cause shifts in the $L^*$ values, the $a^*$ values, and the $b^*$ values associated with the resulting three inaccurately measured inks to those values plotted at $D_1$, $D_2$, and $D_3$ that go in entirely different directions and in different relative amounts, as compared to the $L^*$, the $a^*$, and the $b^*$ values of the three respective inks plotted at $C_1$, $C_2$, and $C_3$, as graphically depicted in FIG. 8.

One problem with this three way error in trying to form the three inks plotted at $C_1$–$C_3$, but instead forming the different inks plotted at $D_1$–$D_3$, is that the $\Delta E^*_{ab}$ differences between pairs of the various inks plotted at $D_1$–$D_3$ change, as compared to the $\Delta E^*_{ab}$ values between respective pairs of the three inks plotted at $C_1$–$C_3$. Thus, these unequal and uncoordinated changes $L^*$, $a^*$, and $b^*$ values between the inks plotted at $C_1$–$C_3$ and the respective inks plotted at $D_1$–$D_3$ may very likely cause the inks plotted at $D_1$–$D_3$ to form a very different color gamut and visually different colors when mixing dots of the inks plotted at $D_1$–$D_3$ with other colors of inks, as compared to when ink dots plotted at $C_1$–$C_3$ are mixed with dots of the other ink colors.

This comparison of the potential effect of errors when separately adding dye to equal weights of the vehicle, as compared to diluting the preformed ink concentrate to form three different inks with different concentrations of the same dye, in accordance with the present invention, readily demonstrates the real advantages of forming different inks with different concentrations of the same dye in accordance with this procedure of the present invention. The inventive technique that relies on the ink concentrate provides a simple and straight forward technique for avoiding random errors introduced by separately measuring dyes three different times into equal weights of the vehicle, such as the random error described with respect to the three inks plotted at $C_1$–$C_3$ in FIG. 7 relative to the three dyes plotted at $D_1$–$D_3$ in FIG. 8. The essential benefit of the method of the present invention that relies on the ink concentrate is that any mixing error in forming the ink concentrate appears in all of the different inks based on the ink concentrate in the same direction and by the same degree.

PROPERTY DETERMINATION AND CHARACTERIZATION TECHNIQUES

Viscosity

Unless otherwise indicated, all ink viscosities recited herein were determined in accordance with or are based upon the following procedure that uses a Brookfield Model DV-III programmable rheometer equipped with an adaptor for small samples. The Brookfield Model DV-III rheometer is available from Brookfield Engineering Laboratories, Inc. of Stoughton, Mass.

The viscosity (the "Brookfield viscosity") of a particular ink sample is determined with the ink sample at room temperature (about 25° C.). About 5 grams of the particular ink being tested are placed in the small sample adaptor which is positioned within the viscosity measurement cell of the rheometer. An appropriate spindle, identified by a spindle number and selected so that the measured viscosity is within the range of the particular spindle, is positioned within the small sample adaptor within the measurement cell. The Brookfield viscosity is measured while running the selected spindle at a revolution per minute (RPM) rate selected based upon calibration studies conducted at the direction of the inventor. For all viscosity determinations and specifications of this disclosure, Spindle No. 18 is selected and is rotated at about 225 RPM during viscosity determinations.

Reflectance Spectra

Unless otherwise indicated, all reflectance spectra recited herein were determined in accordance or are based upon the following procedure that relies on a commercially available spectrodensitometer, the X-Rite 938 Spectrodensitometer that is available from X-Rite, Inc. of Grandville, Mich. Calibration standards supplied by X-Rite, Inc. are used to calibrate the X-Rite 938 Spectrodensitometer. Spectral data obtained by the X-Rite 938 Spectrodensitometer are converted by the spectrodensitometer into various spectral values, including CIELAB L* (lightness), a* (redness/greenness), and b* (yellowness/blueness).

Before the reflectance spectra are evaluated for a particular sample of printed ink, the X-Rite 938 Spectrodensitometer is calibrated to the appropriate calibration standard supplied by X-Rite, Inc. First, the spectrodensitometer is placed on the flat ceramic reflection standard that is supplied by X-Rite, Inc. The reflectance spectra of the reflectance standard are determined after the target window of the spectrodensitometer is centered on the white circle of the reflectance standard and after making sure the spectrodensitometer is flat on and fully located on the ceramic reflection standard. If necessary, appropriate adjustments are made to the spectrodensitometer in accordance with the manufacturer's instructions and the reflectance spectra of the reflectance standard are again determined to ensure spectodensitometer accuracy.

These reflectance spectra of a particular ink are evaluated using a printed sample of the particular ink that is printed using an ink jet printer. Each of the different images that are sampled to determine the L*, a*, and b* values are allowed to dry for about an hour to an hour and 15 minutes before the L*, a*, and b* values are determined. Before spectral data is obtained, the print sample is heated to make the print sample substantially uniform in thickness. Next, the X-Rite 938 Spectrodensitometer is placed on the print sample with the target window of the spectrodensitometer overlying the print sample and the spectrodensitometer fully located on and flat against the print sample. The spectrodensitometer is programmed to characterize spectral data in terms of L*, a*, and b*. Determination of the L*, a*, and b* values for a particular print sample entail five separate measurements of spectral data at five separate locations on the print sample. Thus, the L*, a*, and b* values are based on the average of 25 separate spectra measurements.

After determining L*, a*, b*, for two inks having different colors or different concentrations of the colorant, $\Delta E^*_{ab}$ may be calculated using the following equation: $\Delta E^*_{ab} = [(\Delta L^*)^2 + (\Delta a^*)^2 + (\Delta b^*)^2]^{0.5}$. The numerical value found by calculating $\Delta E^*_{ab}$ indicates the size of the color difference between the two inks, but does not characterize how the colors of the two inks are different. When $\Delta E^*_{ab}$ is about 5 or less, the differences in color between the two ink samples being compared are typically unable to be visually recognized by people with good eye sight.

Surface Tension

Unless otherwise indicated, all surface tension values recited herein were determined with or are based upon use of the DuNOUY interfacial tensiometer that is available from CSC Scientific Company, Inc. of Fairfax, Va. using the surface tension measurement procedures set forth in the instructions accompanying the DuNOUY interfacial tensiometer. All surface tension values recited herein were determined at or are based upon an ink sample temperature of about 25° C.

Conductivity

Unless otherwise indicated, all conductivity determinations recited herein were determined or are based upon use of a Model No. 01481-61 Conductivity Meter that is available from Cole-Parmer Instrument Co. of Vernon Hills, Ill. using the procedure set forth in the instructions accompanying the Model No. 01481-61 Conductivity Meter. All conductivity values recited herein were determined at or are based upon an ink sample temperature of about 25° C.

pH

Unless otherwise indicated, all pH determinations recited or specified herein are based upon use of the Model No. 059-43-00 Digital Benchtop pH/mV Meter that is available from Cole-Parmer Instrument Co. of Vernon Hills, Ill. using the procedure set forth in the instructions accompanying the Model No. 059-43-00 Digital Benchtop pH/mV Meter. All pH values recited herein were determined at or are based upon an ink sample temperature of about 25° C.

Percent Transmission of Light

Unless otherwise indicated, all determinations of the percent transmission of light recited herein were determined or are based upon use of a Spectronic 20⁺ Spectrophotometer that is available from Fisher Scientific Instruments Co. of Pittsburgh, Pa. All percent of light transmission values recited herein were determined at or are based upon an ink sample temperature of about 25° C. The wavelength of light transmitted through a particular sample by the Spectronic 20⁺ Spectrophotometer is adjusted in accordance with details in the instruction manual accompanying the Spectronic 20⁺ Spectrophotometer. For example, when the sample being tested is a black ink, the wavelength of light transmitted by the Spectronic 20⁺ Spectrophotometer is set at 620 nanometers. When the sample being tested is a yellow ink, the wavelength of light transmitted by the Spectronic 20⁺ Spectrophotometer is set at 420 nanometers. When the sample being tested is a cyan ink, the wavelength of light transmitted by the Spectronic 20⁺ Spectrophotometer is set at 665 nanometers. Finally, when the sample being tested is a magenta ink, the wavelength of light transmitted by the Spectronic 20⁺ Spectrophotometer is set at 565 nanometers.

Prior to making a light transmission determination, the spectrophotometer is turned on and allowed to warm up for about 15 minutes. Then, the spectrophotometer is zeroed with nothing in the sample chamber. A sample of the vehicle produced in accordance with Example 1 below is then placed in the sample chamber and the spectrophotometer is adjusted to indicate a percent light transmission of 100%. The spectrophotometer is then adjusted to transmit the appropriate wavelength of light for the particular color of the sample, as mentioned above. Next, the vehicle is dumped out of the sample chamber and the sample chamber is then rinsed several times with fresh portions of the sample to be measured to assure that the measured sample is not diluted by residual matter otherwise remaining in the sample chamber. A fresh portion of the sample is then placed in the sample chamber and the % transmission of light determination is made. Any subsequent determinations for different samples are made following the above mentioned steps, except that the spectrophotometer does not need to be warmed up if the spectrophotometer is left on between determinations.

EXAMPLES

The following examples are presented to describe ink compositions prepared in accordance with the present invention. The examples are presented for purposes of illustration only and are not to be construed as limiting the scope of the present invention.

Example 1

This example demonstrates preparation of the clear vehicle that is used in forming ink concentrates and inks of the present invention The first step in producing the clear vehicle entailed placing 917 grams of steam distilled water, 80 grams of diethylene glycol, and 2 grams of Versene® 100XL chelating agent in a 2000 milliliter glass beaker. The distilled water, diethylene glycol, and chelating agent were then mixed at room temperature and at low speed in the glass beaker, using a mechanical mixer equipped with a high sheer impeller, for about 30 minutes until a homogeneous solution was obtained. Next, 1 gram of Dowicil® 75 biocide was added to the solution in the beaker and the solution was mixed at low speed for an additional 15 minutes using the mechanical mixer. The clear solution contained in the glass beaker was then filtered through a nylon 0.45 micron filter at room temperature to yield the clear vehicle. The nylon 0.45 micron filter is available from Cole-Parmer Instrument Co. of Vernon Hills, Ill.

Example 2

This example demonstrates preparation of an ink concentrate of the present invention where the concentrate is colored with cyan dye. In the first step of this example, 975 grams of the clear vehicle produced in Example 1 were added to a 2000 milliliter glass beaker. A mechanical mixer equipped with a high sheer impeller was placed in the glass beaker. Then, 25 grams of Duasyn Direct Turquoise Blue FRL-SF dye was slowly added to the clear vehicle in the beaker at room temperature while stirring the solution with the mechanical mixer. The mixing of the solution was continued for about an hour until all of the dye had dissolved in the clear vehicle and a clear blue solution free of particulate was obtained. The clear blue solution was then filtered through one of the previously mentioned nylon 0.45 micron filters at room temperature to complete preparation of the cyan ink concentrate. The composition of the cyan ink concentrate is shown in Table III that follows Example 11 below.

Example 3

This example demonstrates preparation of an ink concentrate of the present invention where the concentrate is colored with magenta dye. The technique of forming the magenta ink concentrate includes the same details provided in Example 2 with the exception that 25 grams of Duasyn Acid Rhodamine B-SF were substituted in Example 3 in place of the Duasyn Direct Turquoise Blue FRL-SF that was used in Example 2. The composition of the magenta ink concentrate produced in this example is shown in Table III, which follows Example 11.

Example 4

This example demonstrates preparation of a finished ink of the present invention where the ink has a dark cyan color. In this example, 400 grams of the clear vehicle produced in Example 1 were placed in a 2000 milliliter glass beaker. A mechanical mixer equipped with a high sheer impeller was placed in the glass beaker. While mixing the clear vehicle with the mechanical mixer, 600 grams of the cyan ink concentrate produced in Example 2 was slowly added to the clear vehicle in the beaker at room temperature. The solution of the clear vehicle and the cyan ink concentrate was mixed in the beaker at low speed using the mechanical mixer until the cyan ink concentrate was homogeneously mixed with the clear vehicle. The solution of the vehicle and the ink concentrate was then filtered at room temperature using one of the previously mentioned nylon 0.45 micron filters to complete the dark cyan ink. The composition of the dark cyan ink produced in this example is presented in Table III which follows Example 11 below.

A diluted sample of the dark cyan ink of this Example was diluted to a weight ratio of 0.09 parts of the dark cyan ink and 100 parts of the vehicle. The percent transmission of light was then determined to be about 19.2% for the diluted sample of the dark cyan ink using the Spectronic 20$^+$ Spectrophotometer in accordance with procedure for determining percent transmission of light that is described in detail above.

Example 5

This example demonstrates preparation of a medium cyan ink of the present invention. Procedures set forth in Example 4 was followed in this example with the exception that 180 grams of the cyan ink concentrate of Example 2 were mixed with 820 grams of the clear vehicle of Example 1 in the glass beaker. The composition of the medium cyan ink is shown in Table III that follows Example 11.

A diluted sample of the medium cyan ink of this Example was diluted to a weight ratio of 0.09 parts of the medium cyan ink and 100 parts of the vehicle. The percent transmission of light was then determined to be about 57.8% for the diluted sample of the medium cyan ink using the Spectronic 20$^+$ Spectrophotometer in accordance with procedure for determining percent transmission of light that is described in detail above.

Example 6

This example demonstrates preparation of a light cyan ink of the present invention. The procedure set forth in Example 4 was followed in this example, with the exception that 60 grams of the cyan ink concentrate of Example 2 were mixed with 940 grams of the clear vehicle of Example 1 in the glass beaker. The composition of the light cyan ink produced in this example is shown in Table III which follows example 11.

A diluted sample of the light cyan ink of this Example was diluted to a weight ratio of 0.09 parts of the light cyan ink and 100 parts of the vehicle. The percent transmission of light was then determined to be about 81.8% for the diluted sample of the light cyan ink using the Spectronic 20$^+$ Spectrophotometer in accordance with procedure for determining percent transmission of light that is described in detail above.

Example 7

This example demonstrates preparation of a dark magenta ink of the present invention. The procedure set forth in Example 4 was followed in this example, with the exception that, in this example, 297.6 grams of the magenta ink concentrate of Example 3 were mixed with 702.4 grams of the clear vehicle produced in Example 1. The composition of the dark magenta ink produced in this example is shown in Table III which follows Example 11.

A diluted sample of the dark magenta ink of this Example was diluted to a weight ratio of 0.09 parts of the dark magenta ink and 100 parts of the vehicle. The percent transmission of light was then determined to be about 8.2% for the diluted sample of the dark magenta ink using the Spectronic 20+ Spectrophotometer in accordance with procedure for determining percent transmission of light that is described in detail above.

Example 8

This example demonstrates preparation of a medium magenta ink. The procedure followed in this example is the same as that followed in Example 7, with the exception that 79.8 grams of the magenta ink concentrate were mixed with 920.2 grams of the clear vehicle in the beaker. The composition of the medium magenta ink produced in this example is shown in Table III which follows example 11.

A diluted sample of the medium magenta ink of this Example was diluted to a weight ratio of 0.09 parts of the medium magenta ink and 100 parts of the vehicle. The percent transmission of light was then determined to be about 46.0% for the diluted sample of the medium magenta ink using the Spectronic 20$^+$ Spectrophotometer in accordance with procedure for determining percent transmission of light that is described in detail above.

Example 9

This example demonstrates preparation of a light magenta ink of the present invention. The procedure set forth in Example 7 was followed in this example, with the exception that 24 grams of the magenta ink concentrate were mixed with 976 grams of the clear vehicle in the 2000 milliliter glass beaker. The composition of the light cyan ink of this example is shown in Table III which follows Example 11.

A diluted sample of the light magenta ink of this Example was diluted to a weight ratio of 0.09 parts of the light magenta ink and 100 parts of the vehicle. The percent transmission of light was then determined to be about 78.8% for the diluted sample of the light magenta ink using the Spectronic 20$^+$ Spectrophotometer in accordance with procedure for determining percent transmission of light that is described in detail above.

Example 10

This example demonstrates preparation of a yellow ink of the present invention. The procedure followed in this example was the same as the procedure set forth in Example 4, with the exception that 75 grams of Duasyn Brilliant Yellow GL-SF VP 220 dye was mixed with 925 grams of the clear vehicle in the 200 milliliter glass beaker. The composition of the yellow ink produced in this example is shown in Table III, which follows Example 11.

A diluted sample of the yellow ink of this Example was diluted to a weight ratio of 0.027 parts of the yellow ink and 100 parts of the vehicle. The percent transmission of light was then determined to be about 82.2% for the diluted sample of the yellow ink using the Spectronic 20$^+$ Spectrophotometer in accordance with procedure for determining percent transmission of light that is described in detail above.

Example 11

This example demonstrates preparation of a black ink of the present invention. In this example, 780 grams of steam distilled water and 20 grams of diethylene glycol were placed in a 2000 milliliter glass beaker and mixed at room temperature and at a low speed, using a mechanical mixer equipped with a high sheer impeller, for about 30 minutes until a homogeneous solution was obtained. Then, 1 gram of Dowicil® 75 biocide was added to the mixture of water and diethylene glycol in the 2000 milliliter glass beaker. The mixture in the beaker was then mixed with the mechanical mixer for about 15 minutes at room temperature until the Dowicil® 75 biocide was homogeneously mixed with the solution of distilled water and diethylene glycol in the beaker. Two hundred grams of Duasyn Direct Black HEF-SF Liquid VP 2086 was added to the beaker and mixed with the solution of water, glycol, and biocide in the beaker at room temperature using the mechanical mixer for about 45 minutes until the black dye was fully dissolved in the solution. The solution in the beaker was then filtered through a piece of 0.45 micron filter at room temperature to complete the black ink of this example. The composition of the black ink produced in this example is shown in Table III below.

A diluted sample of the black ink of this Example was diluted to a weight ratio of 0.09 parts of the black ink and 100 parts of the vehicle. The percent transmission of light was then determined to be about 15.2% for the diluted sample of the black ink using the Spectronic 20$^+$ Spectrophotometer in accordance with procedure for determining percent transmission of light that is described in detail above.

TABLE III

|  | Parts by Weight |  |
|---|---|---|
|  |  | Grams of Dye per 100 Grams of Concentrate |
| Clear Vehicle (Example 1) |  | N/A |
| Distilled water | 91.7 |  |
| Diethylene Glycol | 8.0 |  |
| Versene ® 100XL Chelating Agent | 0.2 |  |
| Dowicil ® 75 Biocide | 0.1 |  |
| Cyan Ink Concentrate (Example 2) |  | 2.5 |
| Clear Vehicle (Example 1) | 97.50 |  |
| Duasyn Acid Rhodamine B-SF Dye | 2.50 |  |
|  |  | Grams of Dye per 100 Grams of Ink |
| Dark Cyan Ink (Example 4) |  | 1.5 |
| Clear Vehicle (Example 1) | 40.0 |  |
| Cyan Ink Concentrate (Example 2) | 60.0 |  |
| Medium Cyan Ink (Example 5) |  | 0.45 |
| Clear Vehicle (Example 1) | 82.0 |  |
| Cyan Ink Concentrate (Example 2) | 18.0 |  |
| Light Cyan Ink (Example 6) |  | 0.15 |
| Clear Vehicle (Example 1) | 94.0 |  |
| Cyan Ink Concentrate (Example 2) | 6.0 |  |
| Dark Magenta Ink (Example 7) |  | 0.744 |
| Clear Vehicle (Example 1) | 70.24 |  |
| Magenta Ink Concentrate (Example 3) | 29.76 |  |
| Medium Magenta Ink (Example 6) |  | 0.1995 |
| Clear Vehicle (Example 1) | 92.02 |  |
| Magenta Ink Concentrate (Example 3) | 7.98 |  |
| Light Magenta Ink (Example 9) |  | 0.06 |
| Clear Vehicle (Example 1) | 97.6 |  |
| Magenta Ink Concentrate (Example 3) | 2.4 |  |
| Yellow Ink (Example 10) |  | 7.5 |
| Clear Vehicle (Example 1) | 92.5 |  |
| Duasyn Brilliant Yellow GL-SF VP 220 Dye | 7.5 |  |
| Black Ink (Example 11) |  | 2.0 |
| Distilled water | 69.9 |  |
| Diethylene Glycol | 10.0 |  |
| Dowicil ® 75 Biocide | 0.1 |  |
| Duasyn Direct Black HEF-SF Liq. VP 2086 Dye | 20.0 |  |

The surface tension, viscosity, conductivity, pH, and specific gravity were determined for each of the inks produced in Examples 4–11 using the procedures specified in the PROPERTY DETERMINATION AND CHARACTERIZATION TECHNIQUES section above. The values determined for surface tension, viscosity, conductivity, pH, and specific gravity for each of the inks produced in Examples 4–11 are presented in Table IV below:

TABLE IV

| | Surface Tension dyne/cm | Viscosity (CPS) | Conductivity (m mhos) | pH | Specific Gravity |
|---|---|---|---|---|---|
| Dark Cyan Ink (Example 4) | 69.3 | 1.19 | 2.750 | 9.03 | 1.024 |
| Medium Cyan Ink (Example 5) | 70.0 | 1.14 | 1.569 | 9.24 | 1.019 |
| Light Cyan Ink (Example 6) | 69.5 | 1.14 | 1.193 | 9.29 | 1.017 |
| Dark Magenta Ink (Example 7) | 67.7 | 1.15 | 1.545 | 9.29 | 1.019 |
| Medium Magenta Ink (Example 9) | 69.1 | 1.15 | 1.143 | 9.31 | 1.014 |
| Light Magenta Ink (Example 10) | 69.0 | 1.10 | 1.034 | 9.36 | 1.017 |
| Yellow Ink (Example 10) | 65.5 | 1.43 | 8.84 | 7.37 | 1.050 |
| Black Ink (Example 11) | 69.0 | 1.37 | 2.31 | 8.1 | 1.027 |

Although the present invention has been described with reference to preferred embodiments, workers skilled in the art will recognize that changes may be made in form and detail without departing from the spirit and scope of the invention.

What is claimed is:

1. An ink jet printer ink set, the ink set comprising:
   at least one magenta ink, each magenta ink comprising a magenta dye and a vehicle;
   at least one cyan ink, each cyan ink comprising a cyan dye and the vehicle;
   at least one yellow ink, each yellow ink comprising a yellow dye and the vehicle; and
   wherein at least one dilute magenta ink sample consisting of a ratio of about 0.09 parts of one of the magenta inks to about 100 parts of the vehicle, at least one dilute cyan ink sample consisting of a ratio of about 0.09 parts of one of the cyan inks to about 100 parts of the vehicle, and at least one dilute yellow ink sample consisting of a ratio of about 0.027 parts of one of the yellow inks to about 100 parts of the vehicle each exhibit a light transmission percentage of at least about 79%.

2. The ink jet printer ink set of claim 1 wherein the at least one magenta ink comprises:
   three different magenta inks, each of the magenta inks having different concentrations of magenta dye.

3. The ink jet printer ink set of claim 1 wherein the at least one cyan ink comprises:
   three different cyan inks, each of the cyan inks having different concentrations of cyan dye.

4. The ink jet printer ink set of claim 1 wherein the ink set further comprises at least one black ink.

5. The ink jet printer ink set of claim 1 wherein each magenta ink and each cyan ink has a conductivity of less than about 1.6 m mhos.

6. An ink set of an ink jet printer, the ink set comprising:
   three magenta inks, wherein:
      a first printed image of one of the magenta inks has an L* value of about 56, an a* value of about 94, and a b* value of about −29 when printed with the ink jet printer;
      a second printed image of another of the magenta inks has an L* value of about 73, an a* value of about 82, and a b* value of about −22 when printed with the ink jet printer;
      a third printed image of another of the magenta inks has an L* value of about 83, an a* value of about 53, and a b* value of about −16 when printed with the ink jet printer;
   three cyan inks, wherein:
      a fourth printed image of one of the cyan inks has an L* value of about 51, an a* value of about −39, and a b* value of about −56 when printed with the ink jet printer;
      a fifth printed image of another of the cyan inks has an L* value of about 67, an a* value of about −43, and a b* value of about −41 when printed with the ink jet printer;
      a six printed image of another of the cyan inks has an L* value of about 79, an a* value of about −31, and a b* value of about −26 when printed with the ink jet printer; and
   at least one yellow ink, a seventh printed image of one of the at least yellow inks having an L* value of about 84, an a* value of about 9, and a b* value of about 115 when printed with the ink jet printer.

7. The ink jet printer ink set of claim 6, the ink set further comprising one black ink with an L* value of about −1, an a* value of about −1, and a b* value of about −5.

8. The ink jet printer ink set of claim 6 wherein:
   the first printed image has an L* value of about 55.9, an a* value of about 94.3, and a b* value of about −29.2 when printed with the ink jet printer;
   the second printed image has an L* value of about 73.1, an a* value of about 82.3, and a b* value of about −22.2 when printed with the ink jet printer;
   the third printed image has an L* value of about 83, an a* value of about 52.7, and a b* value of about −15.7 when printed with the ink jet printer;
   the fourth printed image has an L* value of about 51.4, an a* value of about −39.1, and a b* value of about −55.7 when printed with the ink jet printer;
   the fifth printed image has an L* value of about 67, an a* value of about −49.2, and a b* value of about −40.9 when printed with the ink jet printer;
   the sixth printed image has an L* value of about 79, an a* value of about −30.8, and a b* value of about −25.6 when printed with the ink jet printer; and
   the seventh printed image has an L* value of about 84.4, an a* value of about 9.4, and a b* value of about 115.4 when printed with the ink jet printer.

9. A method of printing an image on a substrate with an ink jet printer, the method comprising:
   ejecting a plurality of discrete portions of ink from the ink jet printer toward the substrate, the ink comprising:
      at least three different inks, each ink of each different pair of inks containing either different dyes or different concentrations of the same dye, the at least three different inks comprising:
         a plurality of magenta inks, wherein:
            each of the magenta inks have different concentrations of magenta dye and
            the plurality of magenta inks are each based upon different weight ratios of a magenta ink concentrate and a vehicle, with each of the magenta inks containing different weight ratios of magenta dye and the magenta ink concentrate used to form each of the magenta inks being the same;
         a plurality of cyan inks, wherein:

each of the cyan inks having different concentrations of cyan dye and the plurality of cyan inks are each based upon different weight ratios of a cyan ink concentrate and the vehicle, with each of the cyan inks containing different weight ratios of cyan dye and the cyan ink concentrate used to form each of the cyan inks being the same; and at least one yellow ink; and sequentially forming a plurality of layers of ink dots on the substrate using the discrete portions of ink, adjacent layers comprising overlapping ink dots formed of different inks, the plurality of layers of ink dots constituting the image, and the image fully covering all portions of the substrate beneath the image.

10. A method of making a plurality of different inks using a colorant, the method comprising:

combining one or more vehicle components to make an ink vehicle;

mixing the colorant with some of the ink vehicle to form an ink concentrate;

mixing a first amount of the ink vehicle with a second amount of the ink concentrate to form a first ink; and mixing a third amount of the ink vehicle with a fourth amount of the ink concentrate to form a second ink, the ratio of the first amount of the ink vehicle relative to the second of the ink concentrate being different from the ratio of the third amount of the ink vehicle relative to the fourth amount of the ink concentrate.

11. The method of claim 10, the method further comprising:

mixing a fifth amount of the ink vehicle with a sixth amount of the ink concentrate to form a third ink, the ratio of the fifth amount of the ink vehicle relative to the sixth amount of the ink concentrate being different from both:

the ratio of the first amount of the ink vehicle relative to the second amount of the ink concentrate, and the ratio of the third amount of the ink vehicle relative to the fourth amount of the ink concentrate.

12. A method of making an ink, the method comprising:

preparing a plurality of ink standards contain a different relative amounts of a dye standard;

separately printing images of each of the different ink standards;

determining L* values, a* values and b* values for each of the different printed images;

determining a percentage of light transmission value for each ink standard;

creating curves relating the L*, a*, and b* values determined for each of the different printed images to the percentage of light transmission value determined for each respective ink standard;

combining an ink vehicle and a dye to make the ink in one or more iterations;

determining the percentage of light transmitted by the ink after each iteration; and ceasing the iterations when the percentage of light transmitted by the ink matches a particular combination of L*, a*, and b* values on the curves.

13. The method of claim 12 wherein preparing the plurality of ink standards comprises:

mixing one or more vehicle components to make the ink vehicle;

mixing the dye with some of the ink vehicle to form an ink concentrate; and mixing the ink vehicle with the ink concentrate in a plurality of different ratios to form the plurality of different ink standards.

14. The method of claim 12 wherein:

determining a percentage of light transmission value for each ink standard comprises:

diluting each ink standard to form diluted ink standards; and determining a percentage of light transmission value for each diluted ink standard;

creating curves relating the L*, a*, and b* values determined for each of the different printed images to the percentage of light transmission value determined for each respective ink standard comprises:

creating curves relating the L*, a*, and b* values determined for each of the different printed images to the percentage of light transmission value determined for each respective diluted ink standard;

determining the percentage of light transmitted by the ink after each iteration comprises:

diluting the ink to form a diluted ink sample; and determining a percentage of light transmission value for the diluted ink sample;

ceasing the iterations when the percentage of light transmitted by the ink matches a particular combination of L*, a*, and b* values on the curves comprises:

ceasing the iterations when the percentage of light transmitted by the diluted ink sample matches the particular combination of L*, a*, and b* values on the curves.

15. The method of claim 12 wherein:

separately printing images of each of the different ink standards comprises separately printing images of each of the different ink standards with an ink jet printer.

16. The method of claim 9 wherein each ink dot is circular in shape and each ink dot has about the same diameter.

17. The method of claim 16 wherein each ink dot has a diameter of about 6 mils.

18. The method of claim 9 wherein the at least three different inks further comprise at least one black ink.

* * * * *